US012044052B2

(12) United States Patent
Hirtsiefer

(10) Patent No.: US 12,044,052 B2
(45) Date of Patent: Jul. 23, 2024

(54) FURNITURE CONNECTING FITTING

(71) Applicant: Samet Kalip Ve Madeni Esya San Ve Tic. A.S., Istanbul (TR)

(72) Inventor: Artur Hirtsiefer, Neunkirchen-Seelscheid (DE)

(73) Assignee: Samet Kalip Ve Madeni Esya San Ve Tic. A.S., Istanbul (TR)

( * ) Notice: Subject to any disclaimer, the term of this patent is extended or adjusted under 35 U.S.C. 154(b) by 201 days.

(21) Appl. No.: 17/611,623

(22) PCT Filed: Jun. 13, 2019

(86) PCT No.: PCT/TR2019/050433
§ 371 (c)(1),
(2) Date: Nov. 16, 2021

(87) PCT Pub. No.: WO2020/236099
PCT Pub. Date: Nov. 26, 2020

(65) Prior Publication Data

US 2022/0251890 A1 Aug. 11, 2022

(30) Foreign Application Priority Data

May 20, 2019 (DE) ..................... 10 2019 113 338.6

(51) Int. Cl.
*E05D 3/06* (2006.01)
*E05F 1/12* (2006.01)
*E05F 3/20* (2006.01)

(52) U.S. Cl.
CPC .............. *E05D 3/06* (2013.01); *E05F 1/1253* (2013.01); *E05F 3/20* (2013.01); *E05Y 2900/20* (2013.01)

(58) Field of Classification Search
CPC ....... E05D 3/06; E05D 15/463; E05D 15/401; E05D 7/0407; E05D 2003/163;
(Continued)

(56) References Cited

U.S. PATENT DOCUMENTS 4,983,065 A 1/1991 Spaeth
5,257,437 A * 11/1993 Salice .................. E05D 7/0407 16/236
(Continued)

FOREIGN PATENT DOCUMENTS

DE 19707741 A1 9/1998
DE 20008292 U1 10/2000
(Continued)

OTHER PUBLICATIONS

Machine translation for DE20008292U1 (Year: 2000).*
(Continued)

*Primary Examiner* — Hiwot E Tefera
(74) *Attorney, Agent, or Firm* — Lucian Wayne Beavers; Patterson Intellectual Property Law, PC

(57) ABSTRACT

The invention relates to a furniture connecting fitting (10) having an attachment section (51, 53) for coupling to a cabinet body (110), wherein a kinematic arrangement (30) is coupled indirectly or directly to the attachment section (51, 53), wherein an assembly piece (80) is provided, which assembly piece has a fitting end (81) facing the attachment section (51, 53) and a furniture attachment end (81.3) facing away from the fitting end (81), wherein the attachment section (51, 53) has at least one locating element (55) which, in an assembly position, interacts with a mating element (85) of the assembly piece (80) to form a connection, which acts transversely to the furniture attachment end (81.3) in a form-fitting and detachable manner, wherein an actuating element (60) is provided, which can be moved between a release position and a blocking position, and wherein the actuating element (60) rests against a supporting section (52) to secure the assembly position in the blocking position. Such a furniture connecting fitting can be easily connected to and installed on a cabinet body even in a compact design.

16 Claims, 15 Drawing Sheets

(58) Field of Classification Search

Figure 1:
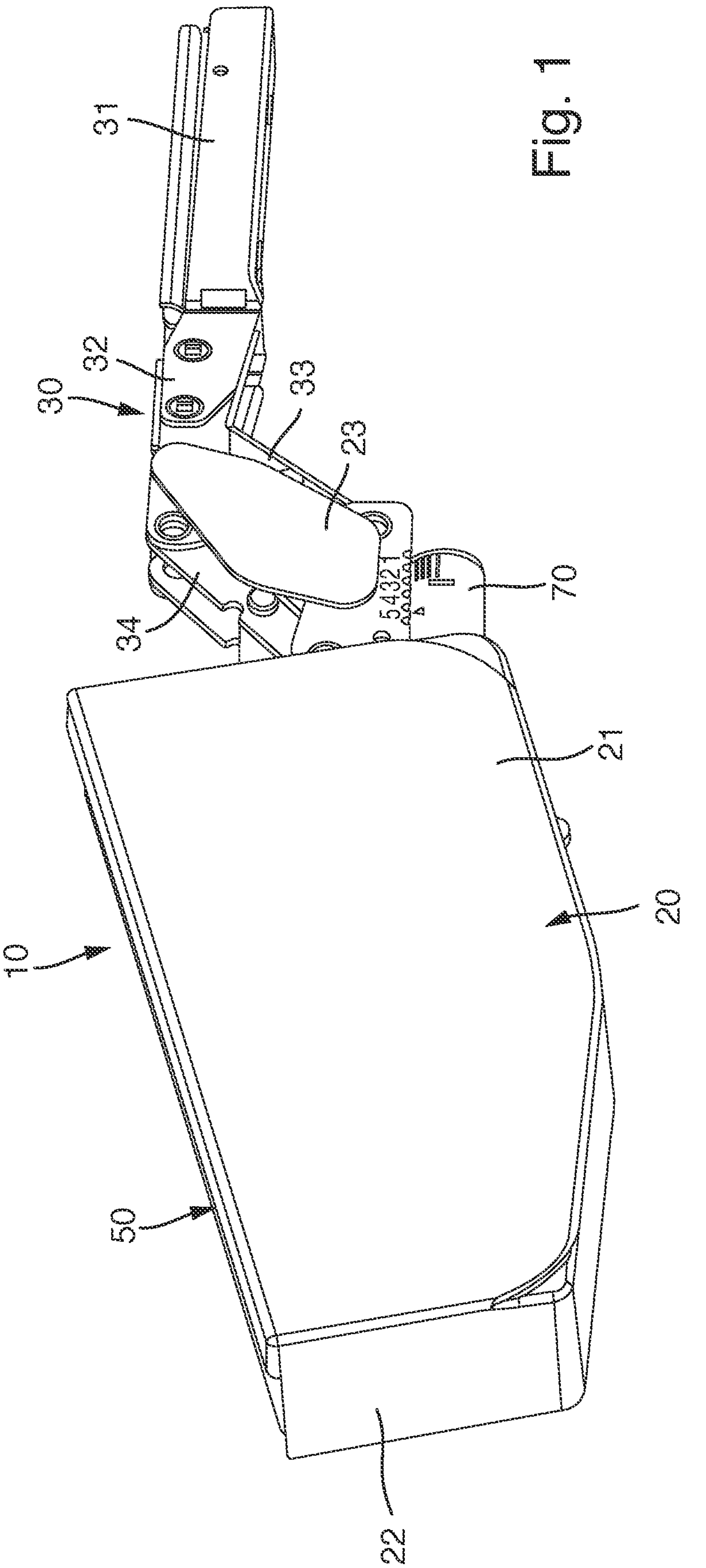

CPC ......... E05F 1/1253; E05F 3/20; E05F 1/1261; E05F 5/02; E05F 1/1058; E05F 1/14; E05F 1/105; E05Y 2900/20; E05Y 2600/56; E05Y 2800/174; E05Y 2800/21; E05Y 2201/618; E05Y 2201/492; E05Y 2201/25; E05Y 2800/31; E05Y 2600/528; E05B 65/44; E05C 19/022

See application file for complete search history.

(56) References Cited

U.S. PATENT DOCUMENTS

| | | | | |
|---|---|---|---|---|
| 8,959,709 | B2 * | 2/2015 | Hasegawa | E05F 5/00 16/50 |
| 10,294,705 | B2 | 5/2019 | Hirtsiefer et al. | |
| 10,428,568 | B2 | 10/2019 | Brunnmayr | |
| 10,662,690 | B2 | 5/2020 | Schluge | |
| 11,008,793 | B2 | 5/2021 | Gzeltepe et al. | |
| 2007/0209156 | A1 * | 9/2007 | Lautenschlager | E05D 5/065 16/238 |
| 2007/0289093 | A1 * | 12/2007 | Nallamottu | E05D 7/0407 16/221 |
| 2008/0209677 | A1 * | 9/2008 | Herper | E05D 7/0407 16/233 |
| 2008/0271292 | A1 * | 11/2008 | Lowe | E05D 7/0407 16/238 |
| 2010/0281652 | A1 * | 11/2010 | Oshima | E05D 7/0407 16/236 |
| 2012/0161598 | A1 * | 6/2012 | Blum | E05F 1/12 16/280 |
| 2014/0319987 | A1 | 10/2014 | Blum | |
| 2016/0333620 | A1 * | 11/2016 | Holzapfel | E05F 1/1058 |
| 2017/0044812 | A1 * | 2/2017 | Schluge | F16H 21/44 |
| 2017/0292307 | A1 * | 10/2017 | Hirtsiefer | E05D 11/00 |
| 2018/0058123 | A1 * | 3/2018 | Salice | E05F 5/02 |
| 2018/0291665 | A1 * | 10/2018 | Güzeltepe | E05D 15/401 |
| 2018/0347251 | A1 * | 12/2018 | Cappellotto | E05D 15/46 |
| 2018/0363348 | A1 * | 12/2018 | Schluge | E05F 1/1058 |
| 2019/0003229 | A1 | 1/2019 | Brunnmayr | |
| 2019/0242167 | A1 * | 8/2019 | Salice | E05F 1/1058 |
| 2020/0095812 | A1 * | 3/2020 | Sander | E05D 7/0407 |
| 2020/0132112 | A1 | 4/2020 | Hirtsiefer | |

FOREIGN PATENT DOCUMENTS

| | | | |
|---|---|---|---|
| DE | 10063266 | A1 | 7/2002 |
| DE | 202006017874 | U1 | 3/2007 |
| DE | 20122827 | U1 | 7/2008 |
| DE | 202010015091 | U1 | 3/2012 |
| DE | 202013007519 | U1 | 11/2013 |
| DE | 102015117291 | B3 | 7/2016 |
| DE | 102014113967 | B4 | 9/2016 |
| DE | 202017102814 | U1 | 9/2018 |
| EP | 371153 | A1 | 6/1990 |
| EP | 1591608 | A1 | 11/2005 |
| EP | 3379010 | A1 | 9/2018 |
| GB | 2322667 | A | 9/1998 |
| WO | 0164075 | A1 | 9/2001 |
| WO | 2009143980 | A1 | 12/2009 |
| WO | 2011020130 | A1 | 2/2011 |
| WO | 2012155165 | A2 | 11/2012 |
| WO | 2013113047 | A1 | 8/2013 |
| WO | 2017143377 | A1 | 8/2017 |
| WO | 2017152212 | A1 | 9/2017 |
| WO | 2018212723 | A1 | 11/2018 |

OTHER PUBLICATIONS

India Office Action for corresponding patent application No. 202147052447, dated Mar. 30, 2022, 6 pages.

International Search Report for corresponding patent application No. PCT/TR2019/050433, dated Feb. 13, 2020, 4 pages (not prior art).

German Office Action for corresponding patent application No. 10 2019 113 338.6, dated May 7, 2020, 10 pages (not prior art).

Co-pending U.S. Appl. No. 17/611,634, filed Nov. 16, 2021 (not prior art).

Co-pending U.S. Appl. No. 17/611,630, filed Nov. 16, 2021 (not prior art).

Co-pending U.S. Appl. No. 17/611,632, filed Nov. 16, 2021 (not prior art).

* cited by examiner

FURNITURE CONNECTING FITTING

The invention relates to a furniture connecting fitting, in particular a hatch holder with an attachment section which is used for coupling to a cabinet body, wherein a kinematic arrangement is coupled directly or indirectly to the attachment section.

Such a furniture connecting fitting is known from DE 10 2014 113 967 B4. In this document, a hatch holder is shown as a furniture hinge, which has a multi-axis articulated link as a kinematic arrangement. This articulated link has a holder to which a furniture hatch can be attached. A spring that can be used to pull the holder from an open position to a closed position is coupled to the kinematic arrangement. The kinematic arrangement is mounted in a housing. The housing has attachment mounts. Fastening bolts can be passed through these attachment mounts and bolted into a cabinet body. In this way, the familiar hatch holder can be securely attached to the furniture in the desired position.

Such a hatch holder is known from DE 10 2015 117 291 B3.

There is an increasing need to provide furniture connecting fittings that are as small as possible and that integrate visually inconspicuously into a cabinet body. In this case, the kinematic arrangement is designed in a very compactly manner in relation to the attachment section, such that the attachment section offers only a few access options to be able to reliably screw or bolt the furniture connecting fitting to the cabinet body.

Therefore the invention addresses the problem of providing a furniture connecting fitting of the type mentioned above, which can be easily and reliably installed on a piece of furniture even if it has a compact design.

This problem is solved by providing an assembly piece that has a fitting end facing the attachment section and a furniture attachment end facing away from the fitting end. Accordingly, a separate assembly piece is provided, the furniture connecting fitting end of which can be connected to the cabinet body. Accordingly, first of all, the assembly piece can be attached to the cabinet body. The attachment section has at least one locating element which, in an assembly position, interacts with a mating element of the assembly piece to form a connection, which acts transversely to the furniture attachment end in a form-fitting and detachable manner. After the assembly piece has been connected to the cabinet body, the attachment section can be secured to the installation piece in a form-fitting manner. Ultimately, according to the invention, an actuating element is provided, which can be moved between a release position and a blocking position, and wherein the actuating element abuts a support section in the blocking position to secure the assembly position. The assembly position may also be referred to as an assembled position.

According to a preferred variant of the invention provision can be made that the locating element and the counter-element can be brought into form-fitting active engagement along an adjustment path, and that the actuating element is guided by an operating device on a control cam during its adjustment from the release position into the blocking position to effect a travel of the attachment section relative to the assembly piece in the direction of the adjustment path. In a furniture connecting fitting designed in such a way, the attachment section can be initially attached to the assembly piece. The actuating element can then be used to move the attachment section to the assembly position. This renders assembly particularly easy.

A further variant of the invention is such that the attachment section is part of a housing, or is coupled to a housing, and that the housing accommodates the kinematic arrangement, which is preferably an articulated arrangement of a hinge, which is particularly preferably designed as a roller chain of a hatch fitting, at least sectionally. This results in a particularly simple and space-saving structure of the furniture connecting fitting.

A furniture connecting fitting according to the invention may be characterized in that the assembly piece comprises at least one alignment element which, in the assembly position, abuts an orientation section of the attachment section or of a component connected to the attachment section, preferably of the housing, and is aligned in position with respect thereto. In this way, the furniture connecting fitting can be exactly positioned in relation to the cabinet body. The alignment element and the orientation section can, for instance, be designed as prefabricated body edges that can be profiled integrally, in particular during the production of the assembly piece and/or the attachment section.

According to a conceivable variant of the invention, provision can be made that the assembly piece has screw mounts, which can be used to secure the former to the cabinet body, preferably to a system perforation of the cabinet body. Such system perforations are known, for instance, as "System 32". Accordingly, the assembly piece can be integrated into the system spacing of a row of mounting holes. The defined assignment of the attachment section to the assembly piece then also ensures that the attachment section, and with it the kinematic arrangement, is precisely positioned and aligned at the furniture.

A particularly simple design results if provision is made that the assembly piece or the housing has a retaining section on which the actuating element can be indirectly or directly adjusted, preferably rotatably mounted. By assigning the actuating element to the assembly piece, a design, in which the fitting part that can be coupled to the assembly piece suitable for right-left assembly can be implemented. Accordingly, for instance, this fitting part can then be used with a first attachment section for right-side assembly and a second attachment section for left-side assembly. Because the actuating element is now assigned to the assembly piece means that it can be used for both types of assembly.

Particularly preferably, for instance, provision can be made for the housing to have an attachment section on opposite sides such that the furniture connecting fitting can be used for right-side or left-side assembly on a cabinet body, wherein the assembly piece can be optionally attached to one of the two fastening sections, and wherein the actuating element is held at the assembly piece in an adjustable manner.

A possible embodiment of the invention may be characterized in that the actuating element has a bearing pin, which is rotatably mounted in a bearing mount, preferably of the assembly piece, in that the actuating element has an operating device which interacts with the supporting section, for instance of the attachment section, and in that the operating device is disposed eccentrically with respect to the axis of rotation formed by the bearing pin. The eccentricity can be used to perform an adjusting motion of the attachment section relative to the assembly piece to move it in the direction of the assembly position. The number of parts required is low, as the actuating element is mounted rotatably with the bearing pin in the bearing mount.

If provision is made that the actuating element has a tool mount which is accessible to a tool from the furniture attachment end facing away from the furniture attachment end, and that preferably the kinematic arrangement is designed in such a way that it uses a component to block the access to the tool mount in a first operating position and permits access to the tool mount in a second operating position, it can be ensured in a simple manner that the connection between the assembly piece and the attachment section can be released as intended only in the open position of the fitting.

It is particularly preferred that a stop is provided against which the actuating element rests in the blocking position. This is to signal to the user that the actuating element has reached its intended assembly position when it rests against the stop. In addition, if the stop is appropriately designed in relation to the actuator, it can also be self-locking, which prevents the actuating element from unintentionally coming loose.

If an invention design is used, in which the actuating element causes the attachment section to move relative to the assembly piece, the stop can be used to limit the travel to the desired extent.

Particularly preferably, for instance, provision can be made for the housing to have an attachment section on opposite sides such that the furniture connecting fitting can be used for right-side or left-side assembly on a cabinet body, wherein the assembly piece can be optionally attached to one of the two fastening sections, and wherein the actuating element is held at the assembly piece in an adjustable manner.

The furniture connecting fitting according to the invention can be implemented in particular with a small number of parts if provision is made that the counter element or elements are formed integrally with the assembly piece, wherein the assembly piece is preferably manufactured as a stamped and bent part from a sheet metal blank, that the counter element has a retaining section, which interacts with the locating element to form the form-fitting connection in a direction perpendicular to the furniture attachment end, and that an angled section is used to hold the retaining section on the assembly piece such that it is preferably at a distance from a surface forming the fitting end.

According to a preferred variant of the invention, provision may be made that the assembly piece has one or more, preferably integrally formed, spacers, which project beyond a surface forming the fitting furniture attachment end and which bear against the attachment section in the assembly position. The predefined spacers make for an exact alignment of the assembly piece with respect to the fitting end. Of course, it is also possible to provide the spacers not at the assembly piece but at the attachment section, or in part at the assembly piece and in part on the attachment section.

According to a preferred variant of the invention, provision can be made that at least one guide is effective between the assembly piece and the attachment section, which guide is formed by a guide element and a guide mount, with which the guide element engages or at which the guide element is guided, that the guide element is guided in or at the guide mount during travel of the attachment section from an initial position to the assembly position. On the one hand, this measure makes for a precisely guided assembly. On the other hand in the mounting position, the guide element rests against an area of the guide mount to establish a connection that acts in a form-fitting manner in the direction of the furniture attachment end. It can be used, for instance, to secure the attachment section to the assembly piece to prevent the two parts from twisting around each other in at least one direction. This provides additional and reliable stability of the connection between the attachment section and the assembly piece.

According to a further variant of the invention, provision may be made that one or more projections are provided on the assembly piece, which projections are designed to engage with a bore mount of the cabinet body in a form-fitting manner. The bore mount can be, for instance, a hole of the above-mentioned system perforation.

The invention also relates to a method of installing a furniture connecting fitting in a cabinet body, wherein the cabinet body has a side panel and a top panel, wherein the furniture connecting fitting is designed in accordance with one of the claims 1 to 14, wherein the assembly piece can be used as a drilling template and has at least one penetration for this purpose, wherein one contact section of the assembly piece is placed against the underside of the top panel, wherein a drilled hole is then made in the cabinet body through at least one of the penetrations, and wherein the assembly piece is then connected to the cabinet body, wherein projections of the assembly piece are preferably inserted into the holes drilled previously, and wherein finally the assembly piece is connected to the cabinet body using fastening bolts.

According to the invention, the assembly piece can therefore have a further function and be used as a drilling template.

Figure 2:
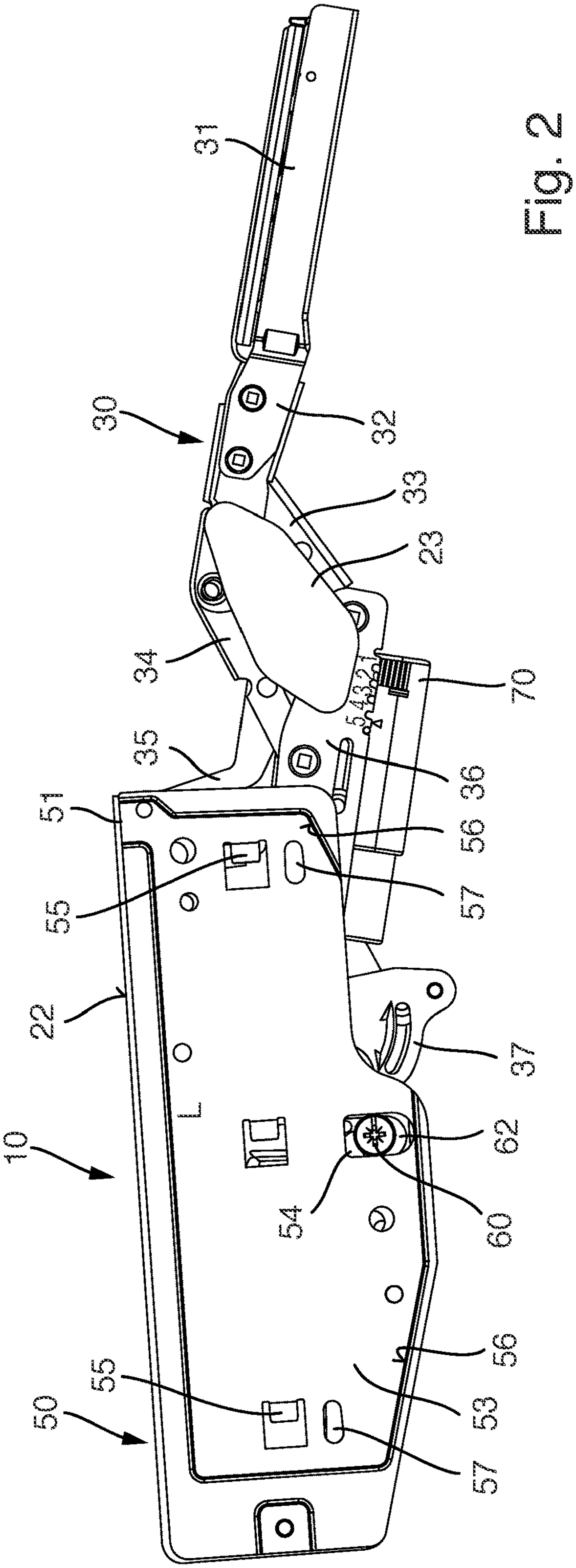
Figure 3:
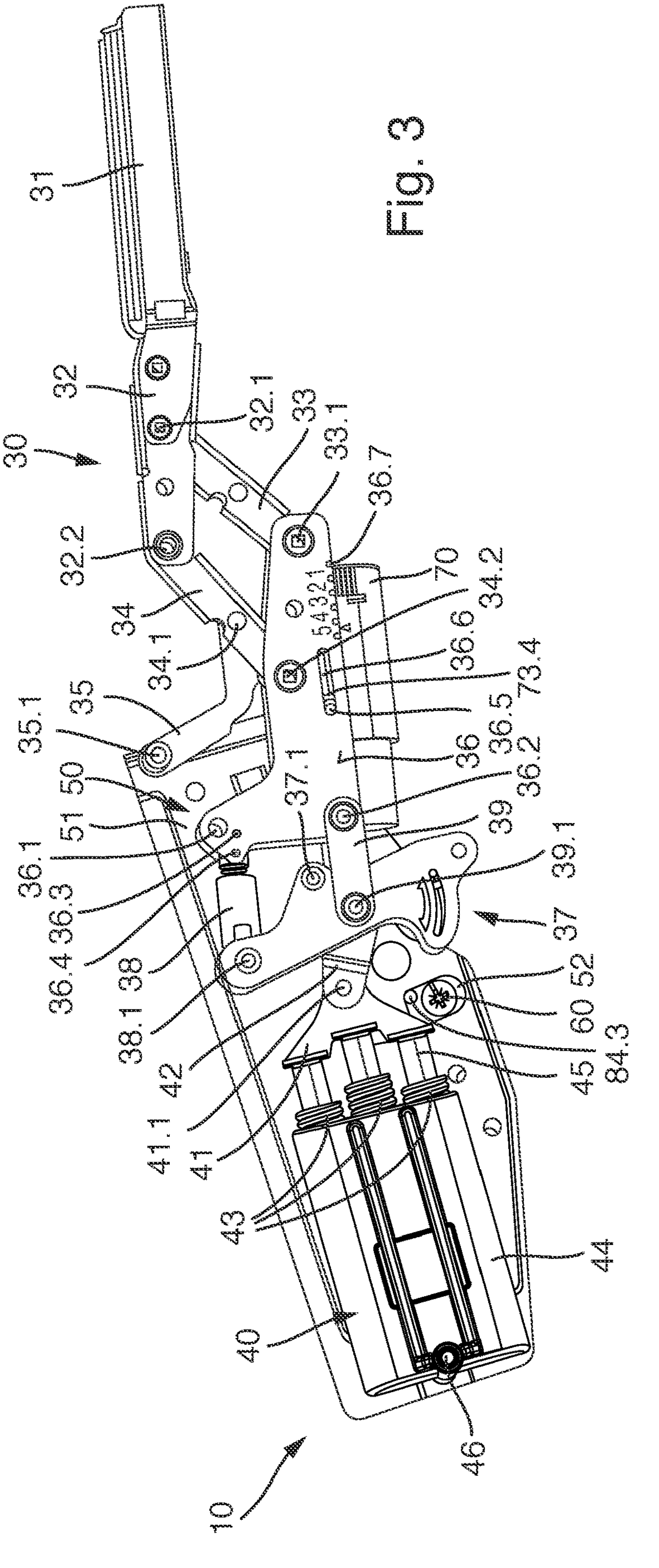
Figure 4:
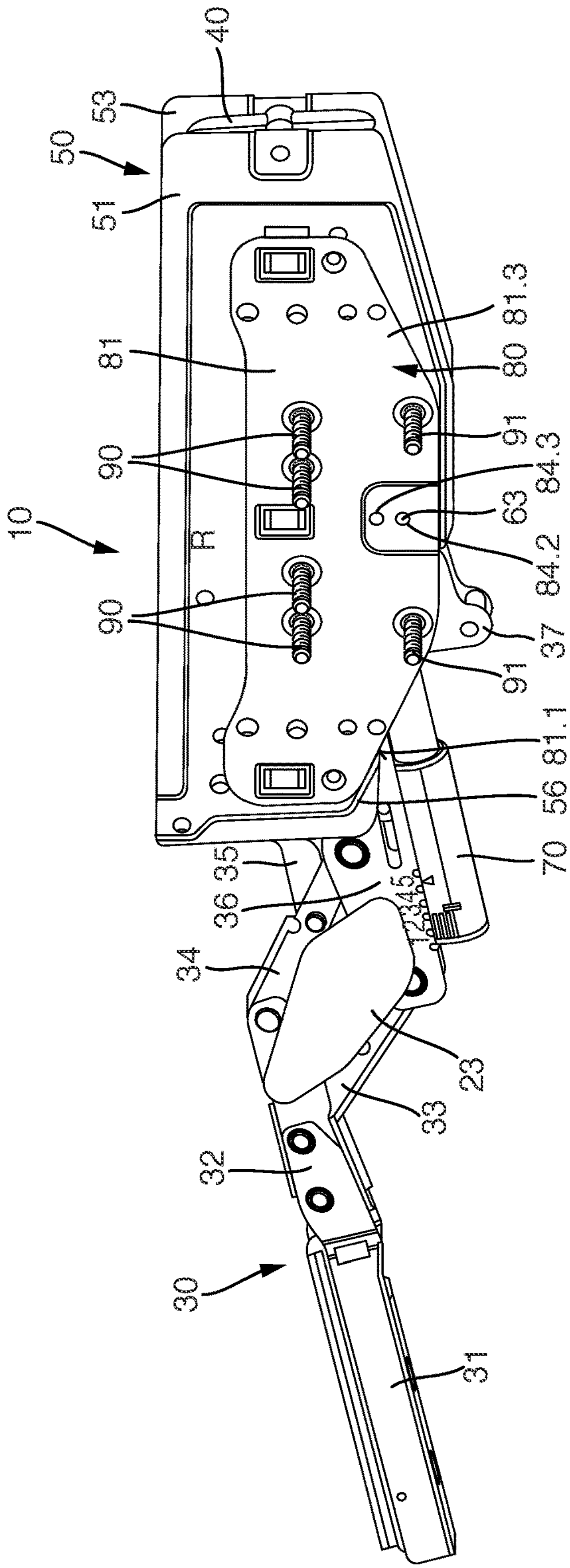
Figure 5:
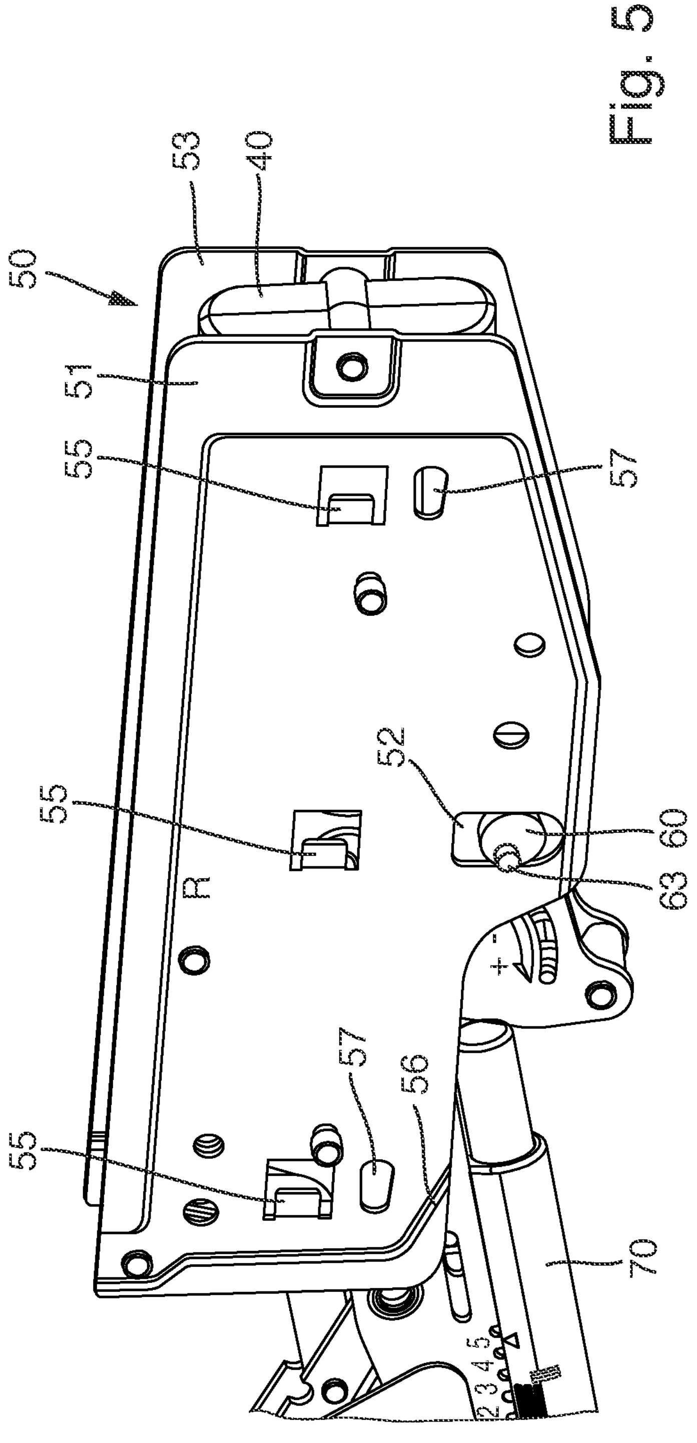
Figure 6:
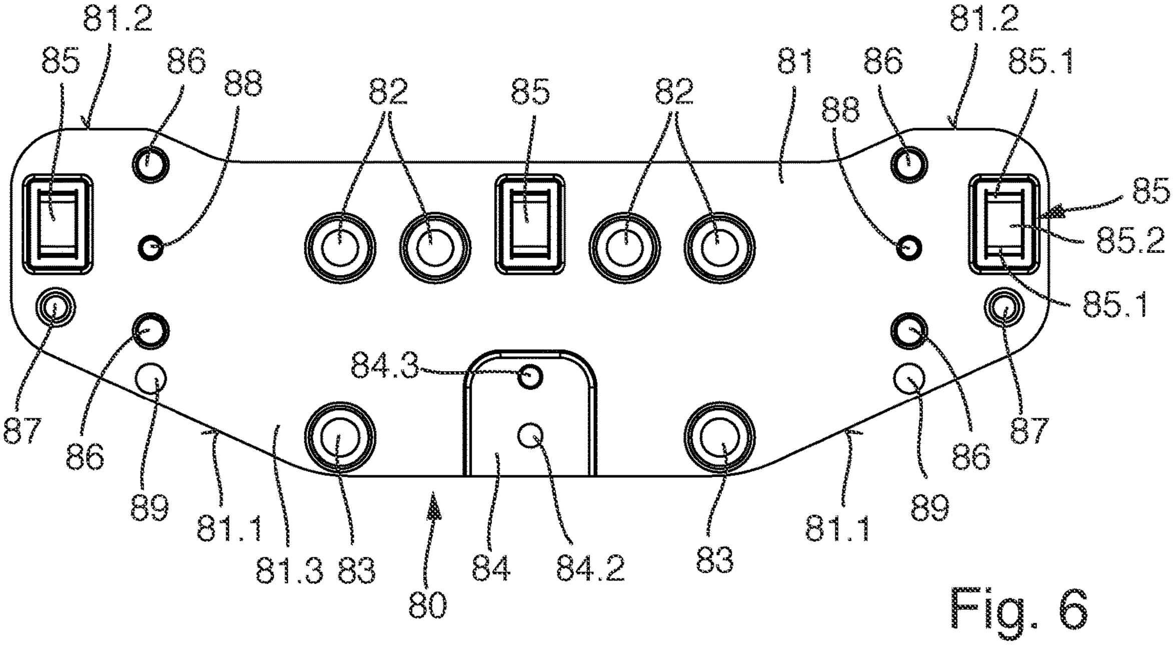
Figure 7:
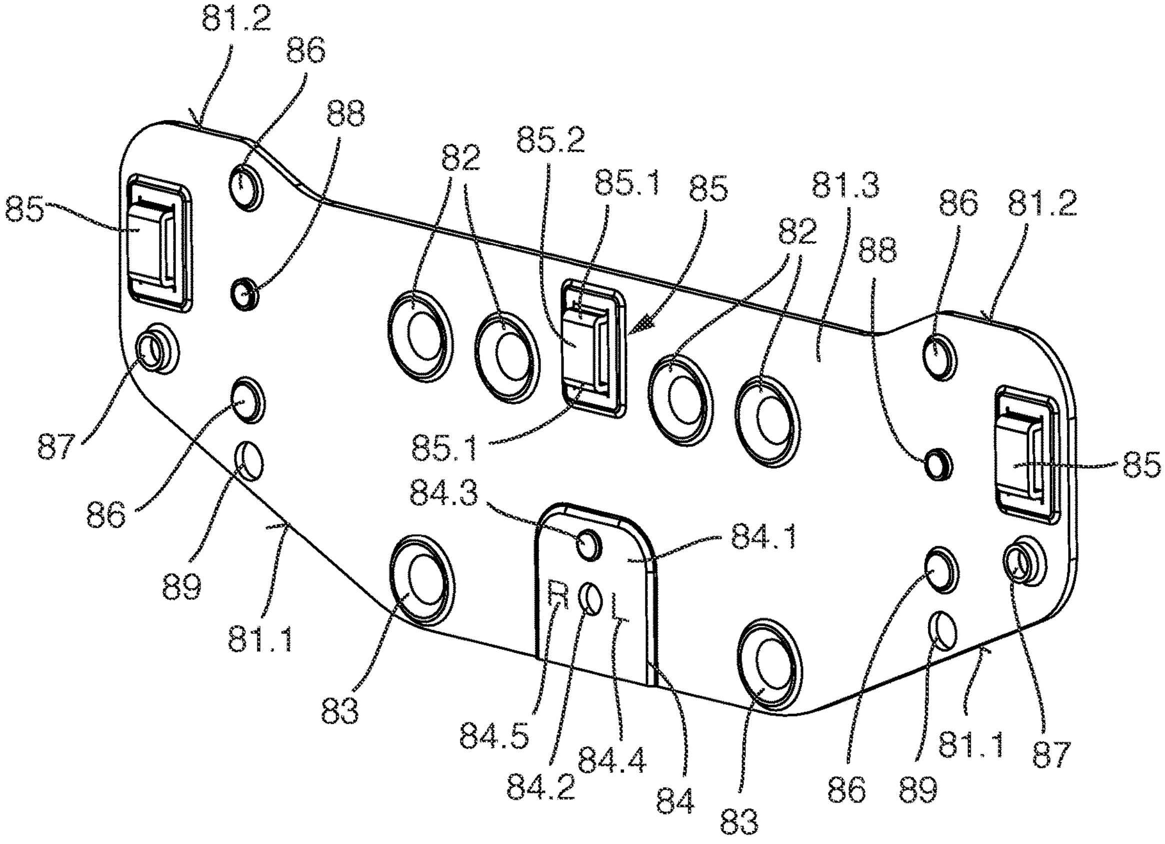
Figure 8:
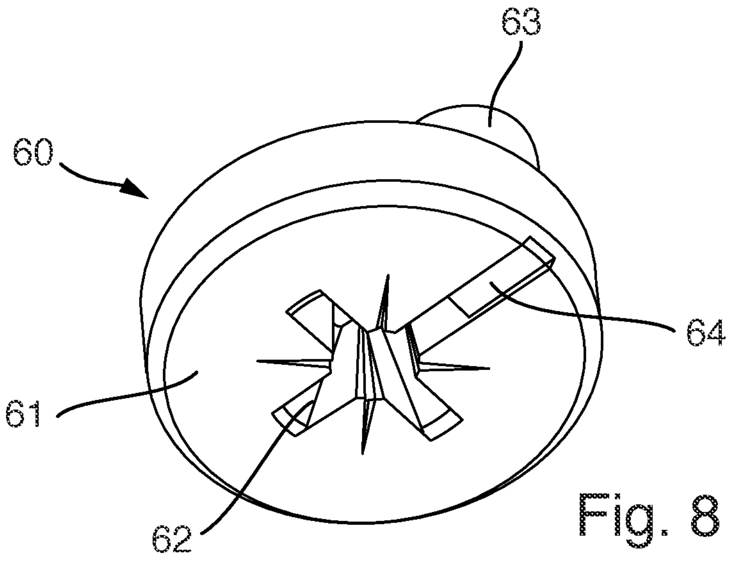
Figure 9:
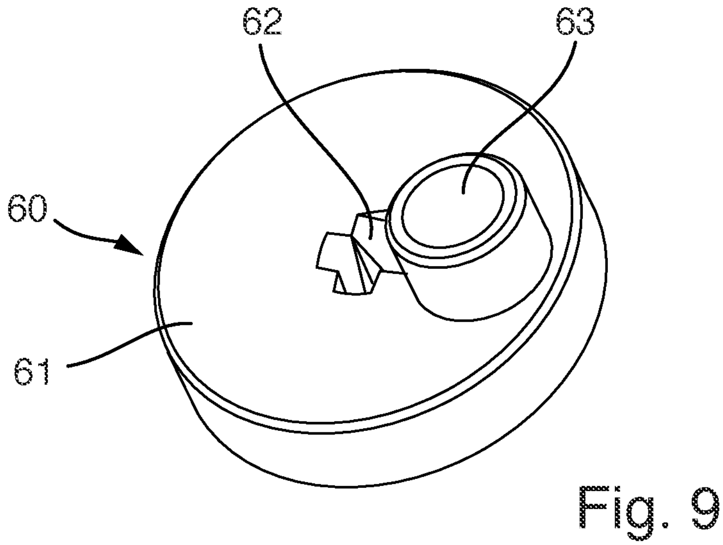
Figure 10:
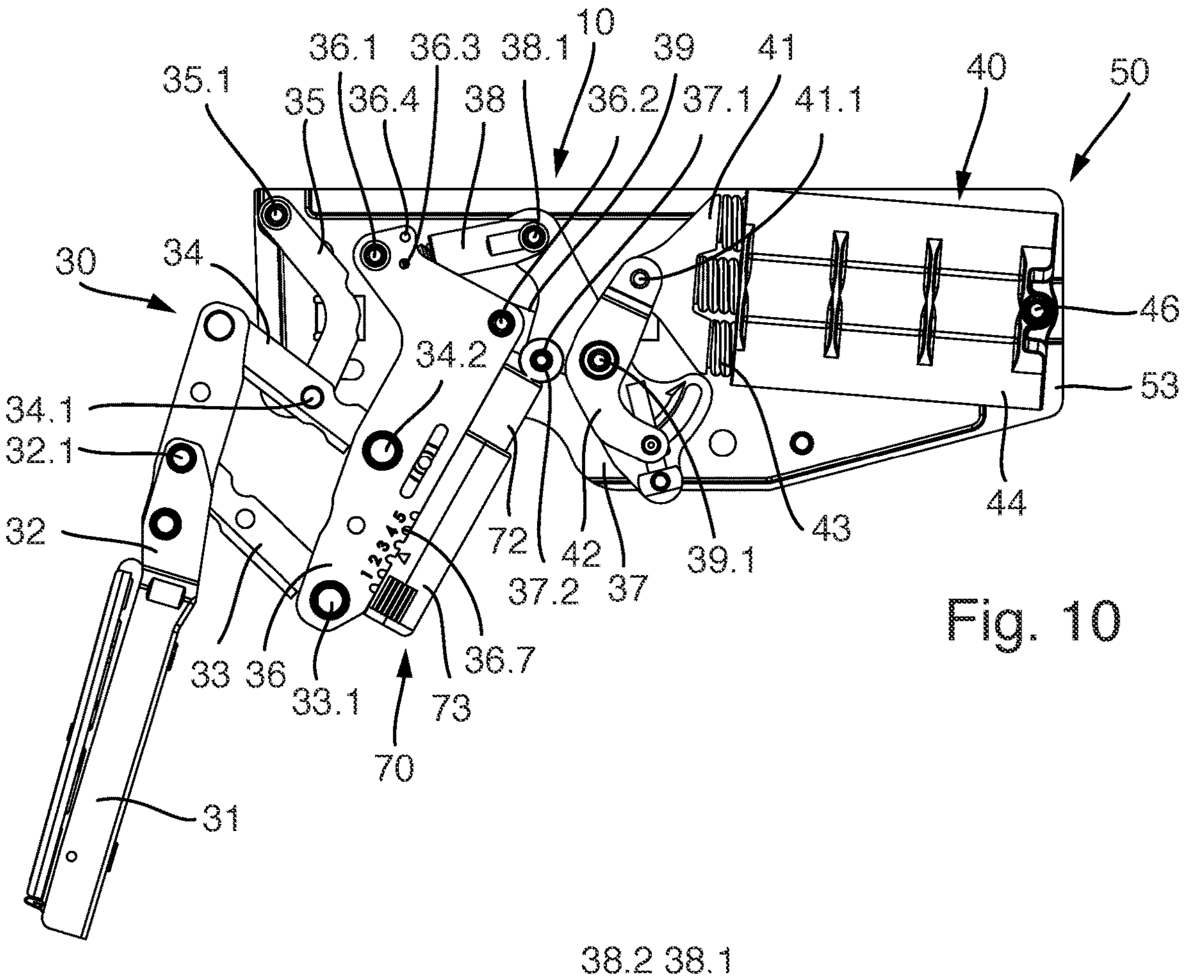
Figure 11:
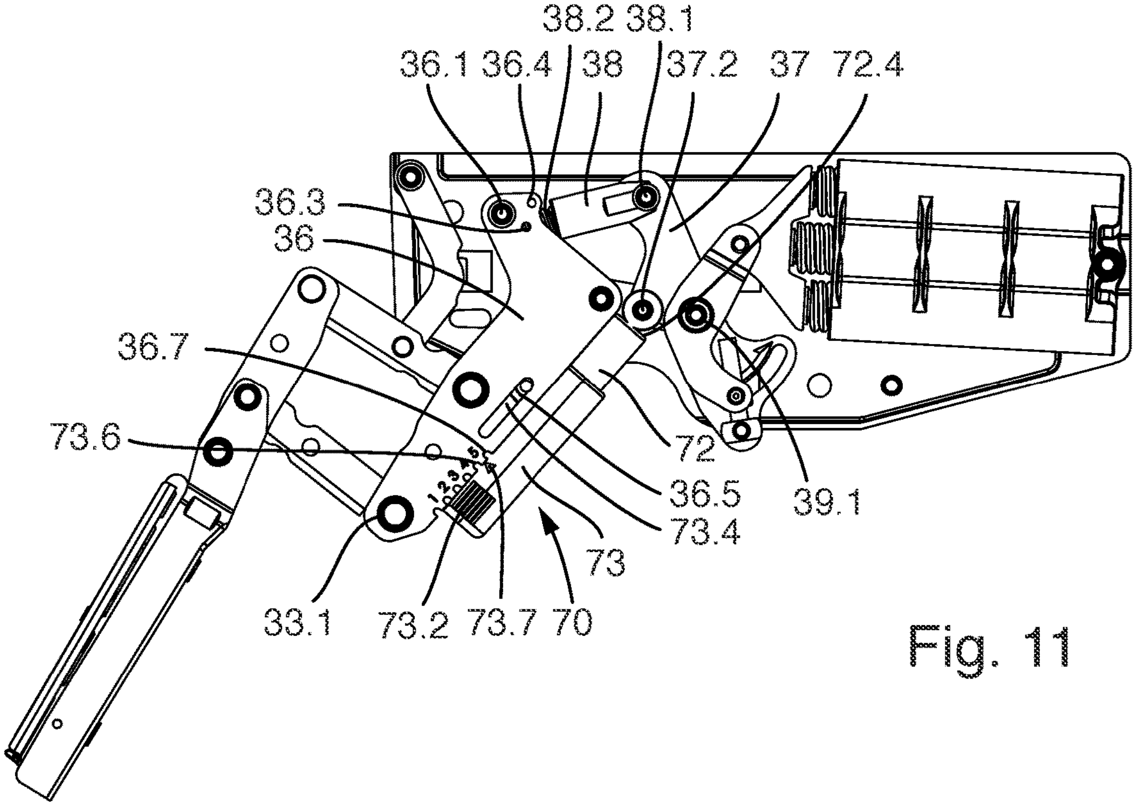
Figure 12:
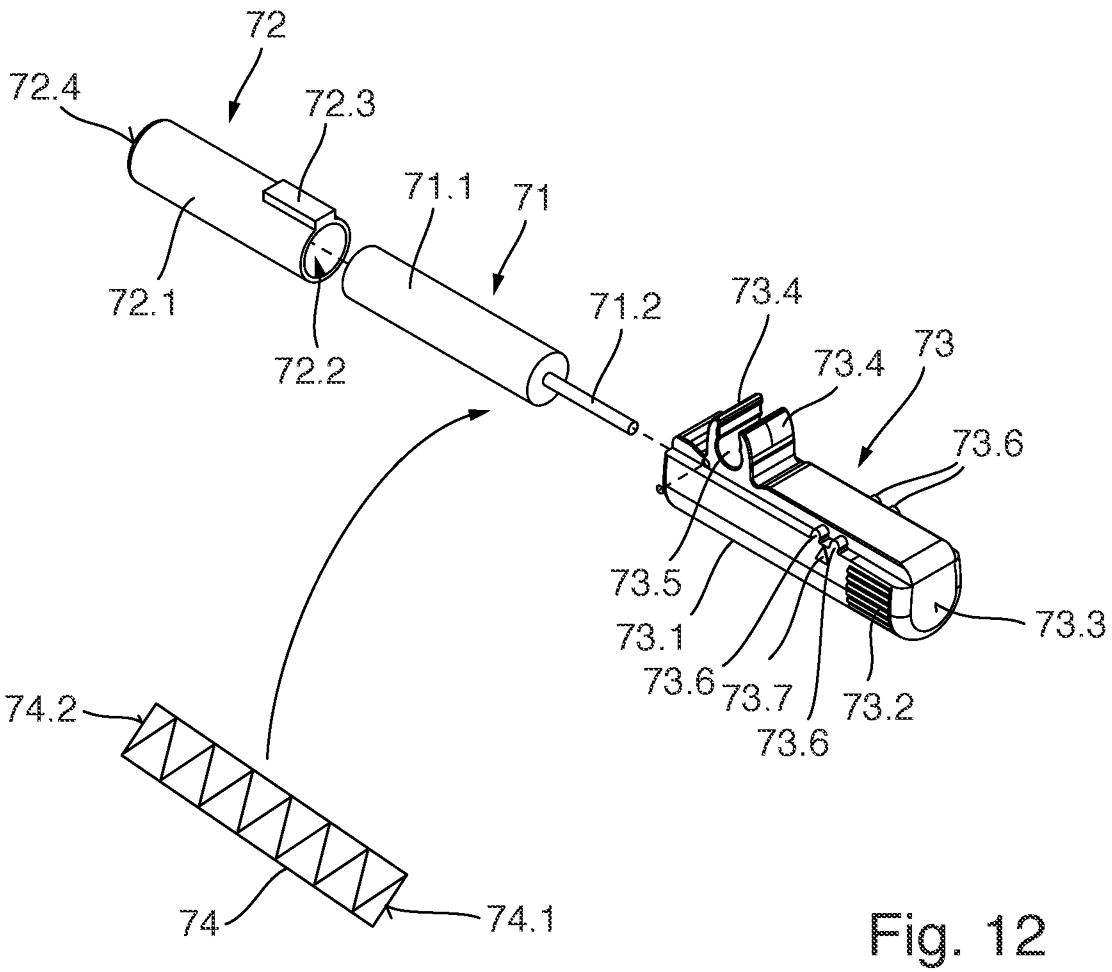
Figure 13:
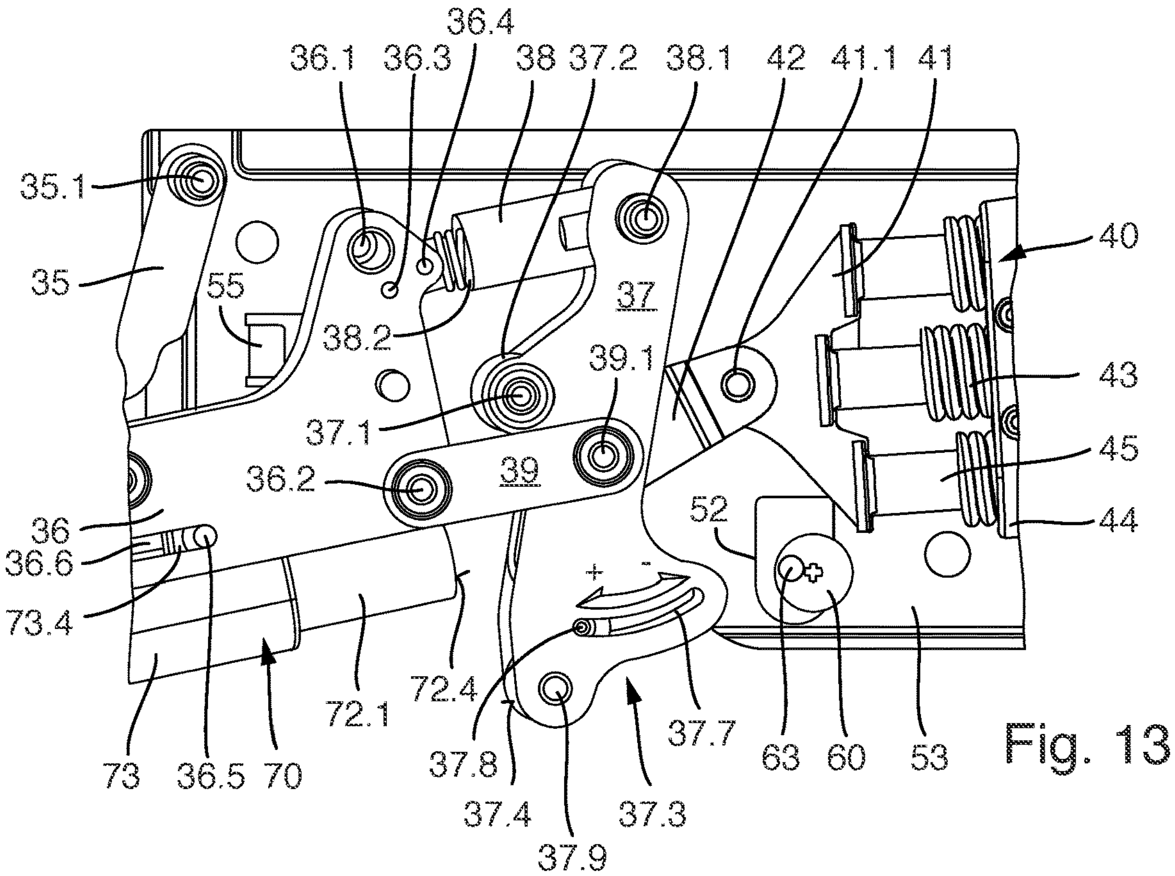
Figure 14:
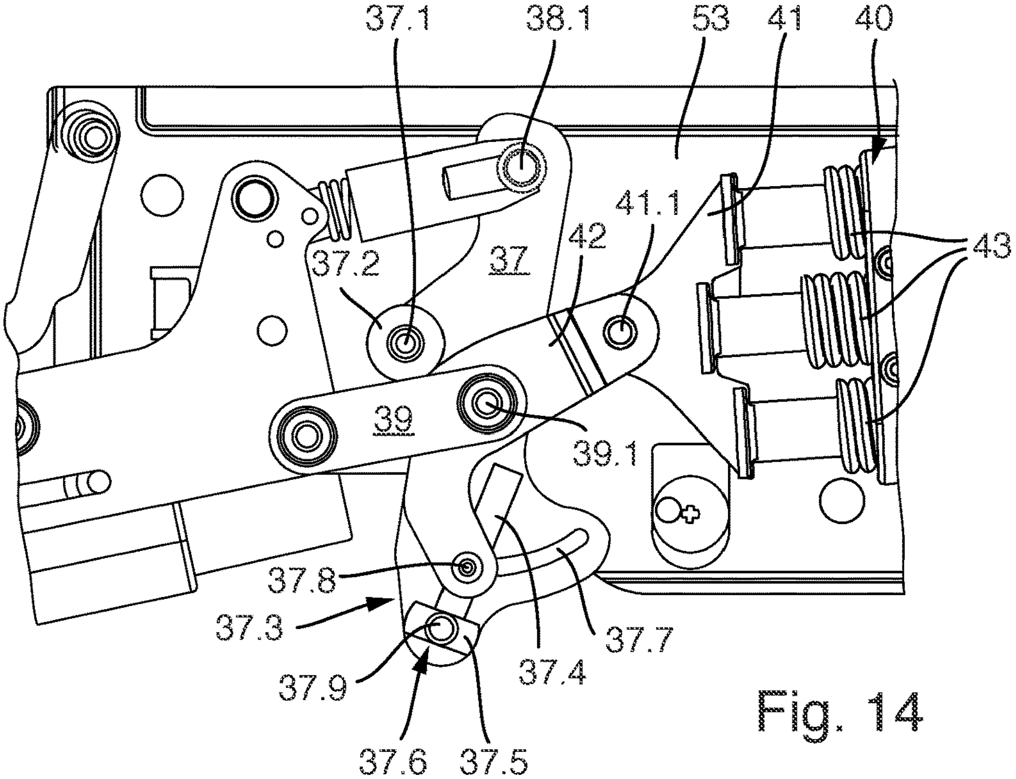
Figure 15:
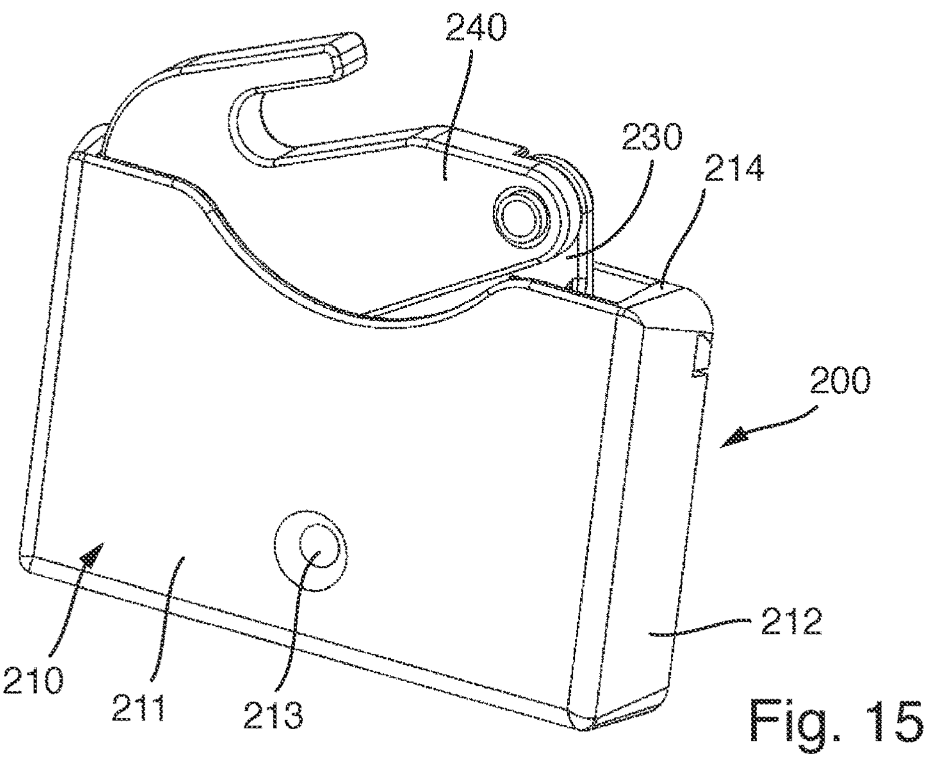
Figure 16:
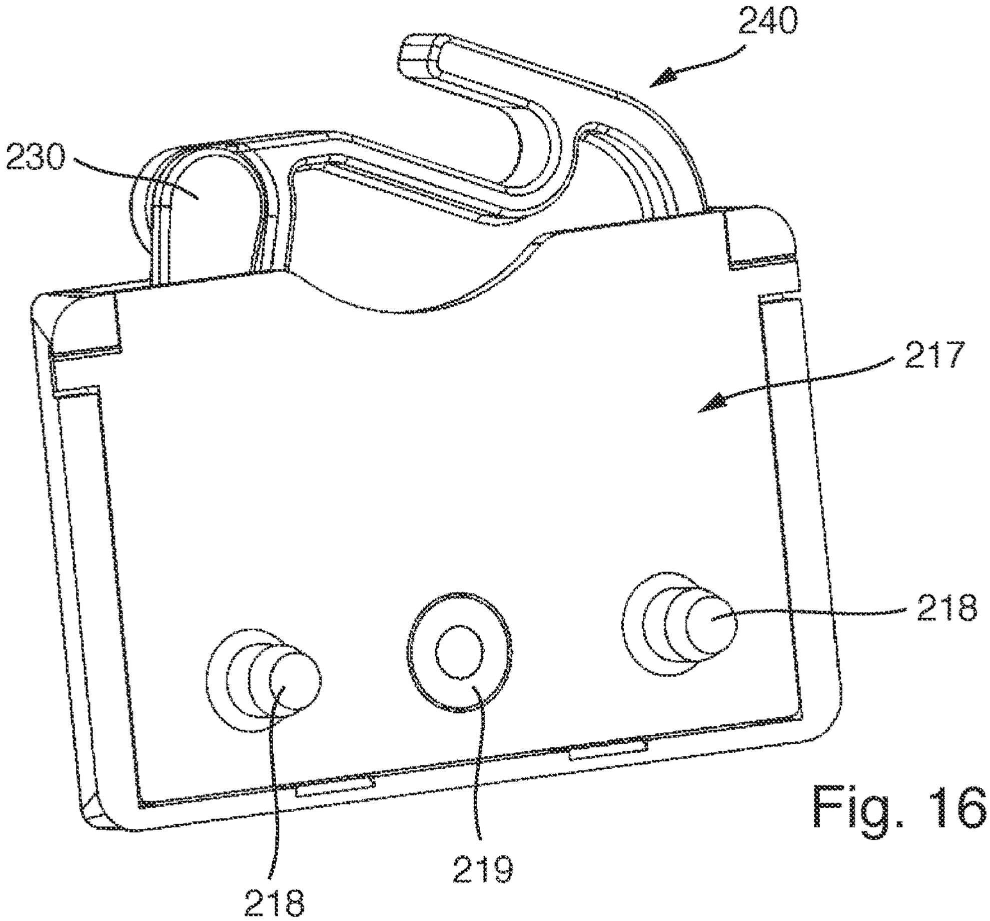
Figure 17:
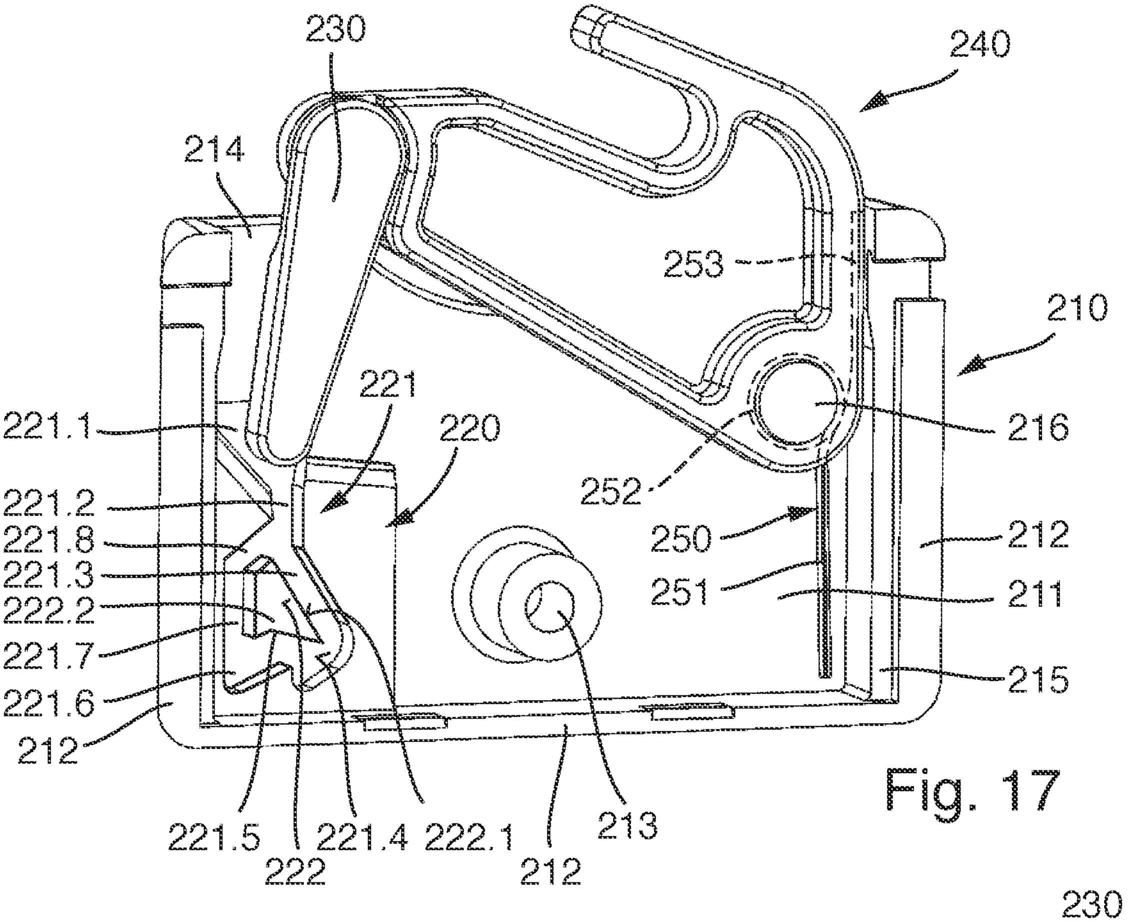
Figure 18:
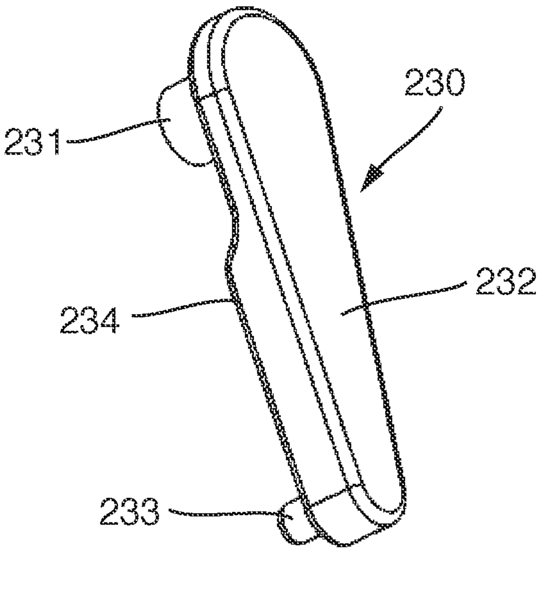
Figure 19:
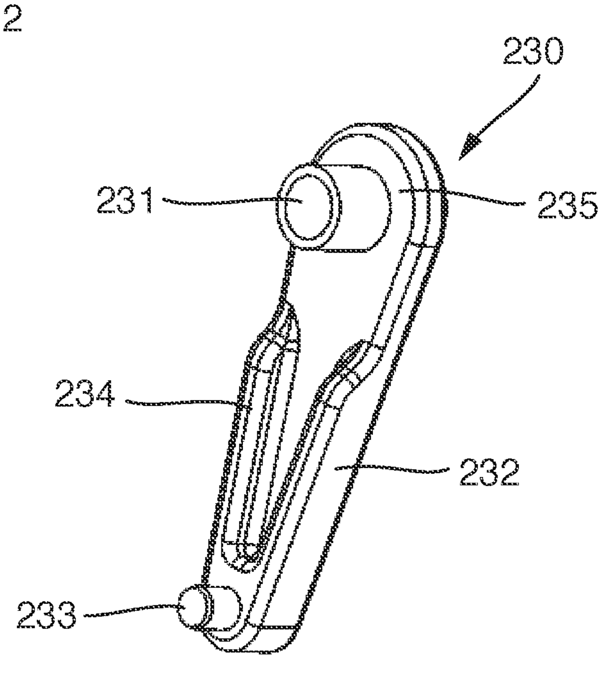
Figure 20:
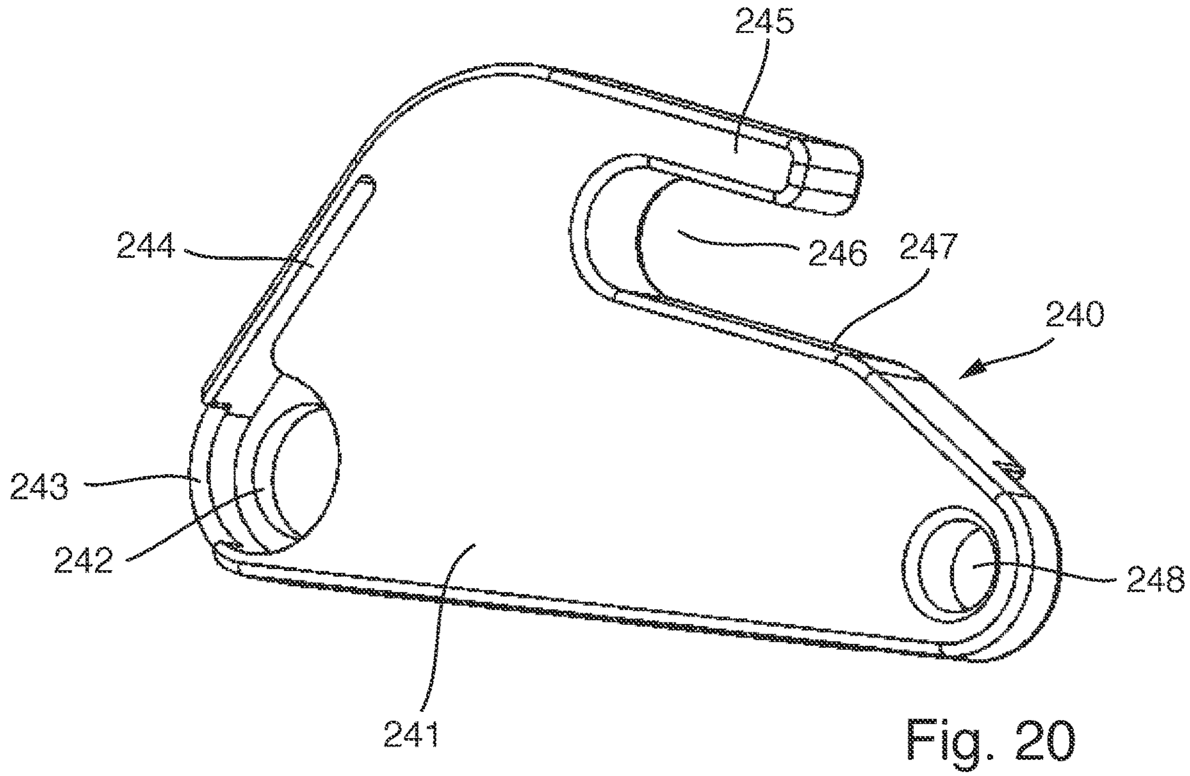
Figure 21:
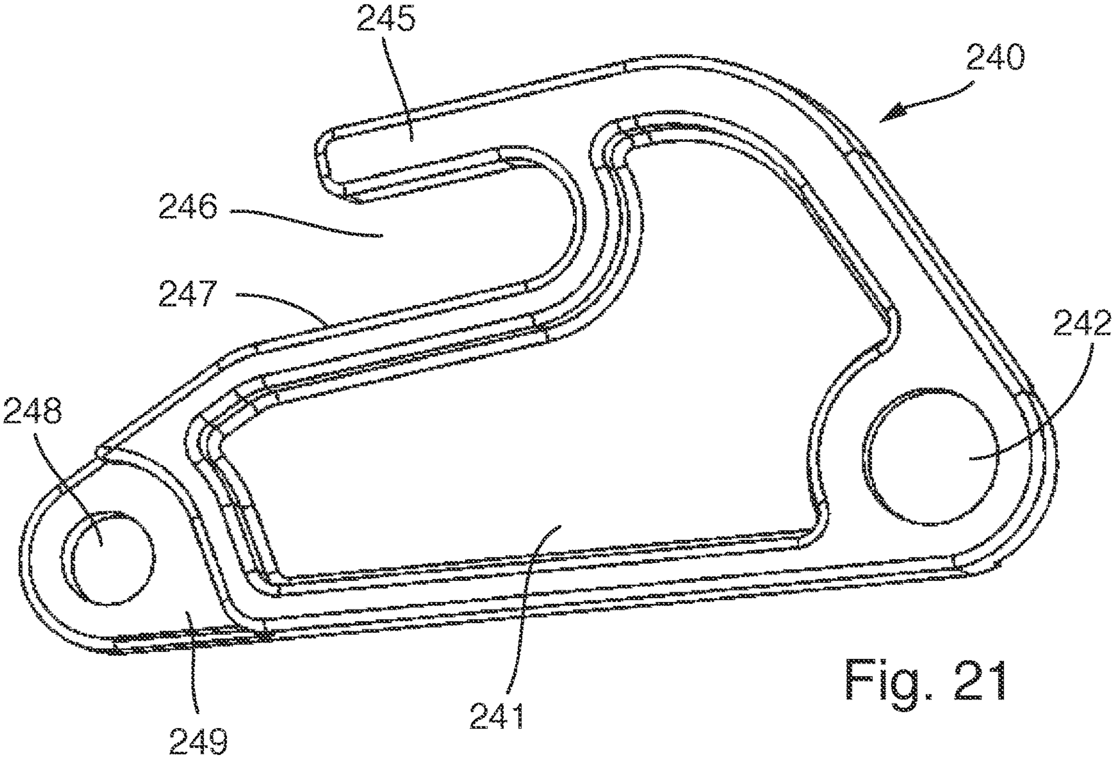
Figure 22:
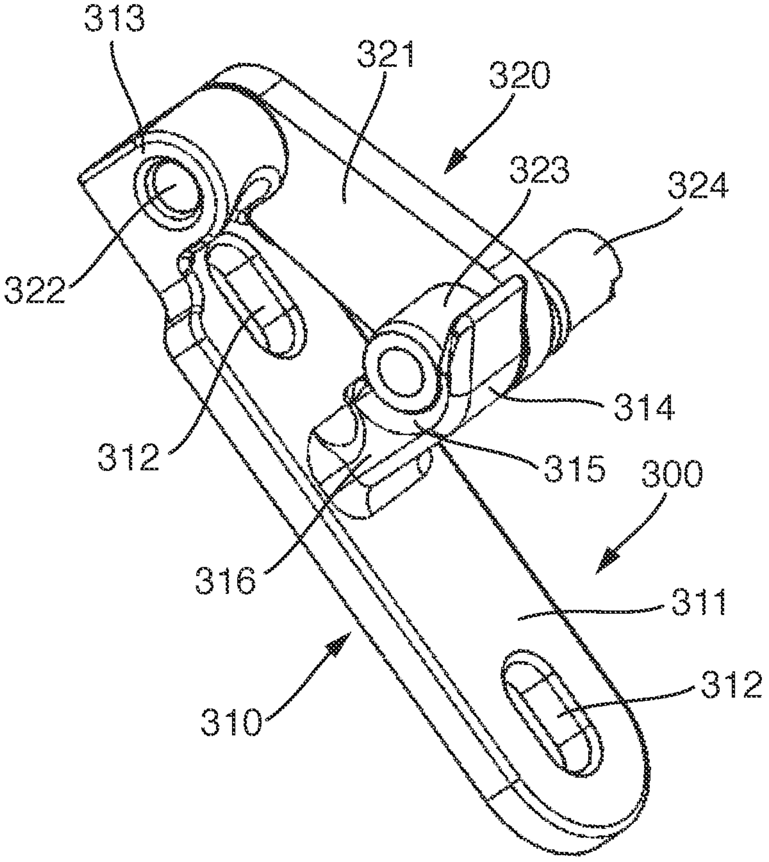
Figure 23:
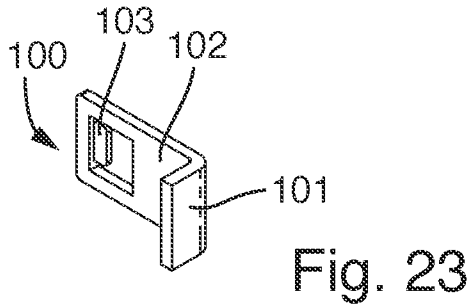
Figure 24:
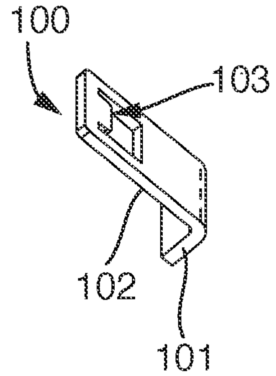
Figure 25:
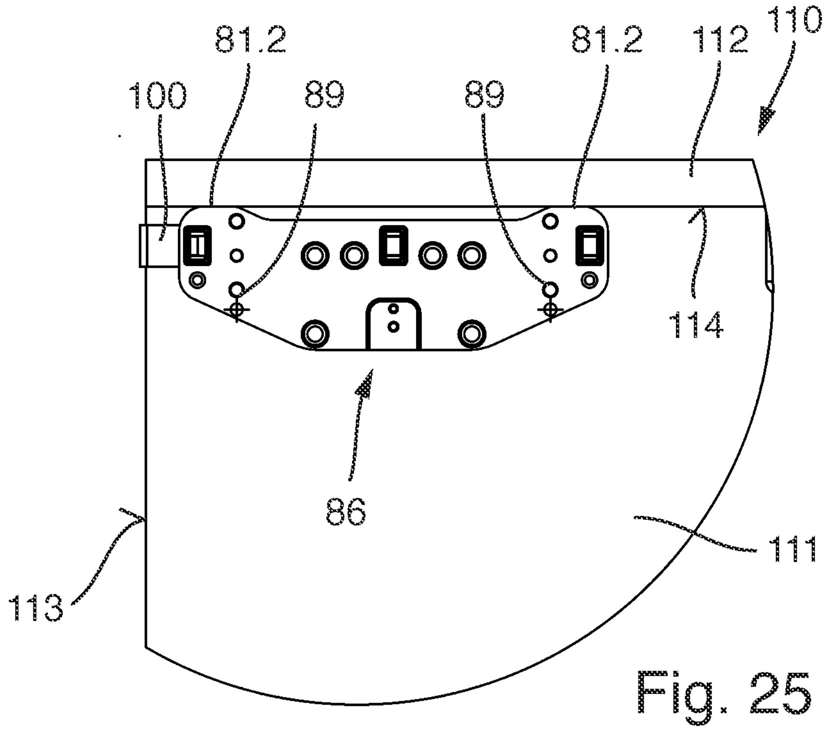

The invention is explained in greater detail below based on an exemplary embodiment shown in the drawings. In the Figures:

FIG. 1 shows a perspective view of a furniture connecting fitting having a hatch holder, FIG. 2 shows a modified perspective view of the hatch holder according to FIG. 1 without the cover, FIG. 3 shows the representation according to FIG. 2, wherein the housing of the hatch holder is open, FIG. 4 shows a rear view of the hatch holder in accordance with FIGS. 1 to 3, FIG. 5 shows a detailed view taken from FIG. 3, wherein one assembly piece has been removed, FIGS. 6 and 7 shows different views of the assembly piece of FIG. 4, FIGS. 8 and 9 show different views of an actuating element, FIGS. 10 and 11 show various operating positions of the hatch holder, FIG. 12 shows an exploded view of the actuating arrangement of the hatch holder FIGS. 13 and 14 are detailed perspective views of the kinematic arrangement of the hatch holder, FIG. 15 shows a perspective view of an interlock from the front, FIG. 16 shows a perspective rear and bottom view of the interlock in accordance with FIG. 15, FIG. 17 shows a view of the interlock as shown in FIG. 16, wherein a lid has been removed from the interlock, FIGS. 18 and 19 show different views of a catch, FIGS. 20 and 21 show different views of a latch, FIG. 22 shows a perspective view of an attachment arrangement, FIGS. 23 and 24 show various views of an assembly element and FIG. 25 shows a side view of a cabinet body and the assembly piece according to FIGS. 6 and 7.

FIG. 1 shows a hatch holder as a furniture connecting fitting 10. It is used to attach a furniture hatch having a horizontal swivel axis to a cabinet body 110 (see, for instance, FIG. 25). For this purpose, furniture connecting fittings 10 are usually attached to opposite ends of the cabinet body 110, to which the furniture hatch to be moved is attached.

The furniture connecting fitting 10 has a housing 50. A kinematic arrangement 30 is disposed in this housing 50. The kinematic arrangement 30 includes a multi-axis, so-called roller chain or kinematic chain. Accordingly, the kinematic arrangement 30 is formed by a plurality of levers interconnected by links. The kinematic arrangement 30 may also be referred to as a mechanical linkage 30. As used herein the term "lever" may refer to one of the rigid members of the mechanical linkage 30 and the term "link" may refer to a connection between two of the rigid members, which connection may be a pivotal connection.

An attachment lever 31 is provided at the kinematic arrangement 30. This lever can be used to connect the furniture connecting fitting 10 to the furniture hatch (not shown).

The housing 50 is covered by a cover 20. The cover 20 has a front panel 21. Side panels 22 are connected to the front panel 21.

Furthermore, a cover element 23, which covers the area between two levers, in this exemplary embodiment an area formed between a 1st and a 2nd deflection lever 33, 34 of the kinematic arrangement 30, may be used. In this way, a hand guard is provided to prevent fingers from becoming pinched in the area between the two levers during an intended motion of the kinematic arrangement 30.

FIGS. 2 and 3 show the structure of the kinematic arrangement 30 more clearly. As shown in particular in FIG. 3, the kinematic arrangement 30 has the two deflection levers 33, 34 adjoining the attachment lever 31. The 1st deflection lever 33 can be connected to the attachment lever 31 via a 1st link 32.1. The 2nd deflection lever 34 is also connected to the attachment lever 31 via a 2nd link 32.2. In accordance with this exemplary embodiment, provision may be made for this purpose that the attachment lever 31 has an extension 32, to which the two deflection levers 33, 34 are attached via the 1st and 2nd links 32.1, 32.2. On the end facing away from the attachment lever 31, the two deflection levers 33, 34 are attached to a connection element 36, which also has the form of a lever. Accordingly, the 1st deflection lever 33 is swivel mounted at the connection element 36 via a 3rd link 33.1 and the 2nd deflection lever 34 is swivel mounted at the connection element 36 via a 5th link 34.2. FIG. 3 clearly shows that an articulated lever 35 is also provided. The articulated lever 35 is connected to the second deflection lever 34 via a 4th link 34.1. On its end facing away from the 2nd deflection lever 34, the articulated lever 35 is connected to an attachment section 51 of the housing 50 via a 6th link 35.1.

The connection element 36 bears an actuating arrangement 70. It can be used to adjust a force of a damper 71 acting at the kinematic arrangement 30, as shall be explained in more detail later.

The connecting element 36 has a 7th and an 8th link 36.1, 36.2. The 7th link 36.1 is connected to the fastening section 51 in a stationary position, such that the connecting element 36 can be swiveled about the swivel point defined by the 7th link 36.1.

The connection element 36 has two mounting positions 36.3 and 36.4 in the area of the 7th link 36.1. The actuating element 38 can be articulated at any of these two mounting positions 36.3 and 36.4, according to preference. The selected mounting position depends on the desired mode of operation, which will be explained in more detail later. An actuating lever 39 is swivel mounted at the 8th link 36.2. The actuating lever 39 and the actuating element 38 are each connected to an actuator 37 via a 9th link 38.1 and a 10th link 39.1. The 6th, 7th and 9th links 35.1, 36.1 and 38.1 are fixedly connected to the attachment section 51 and the levers 35, 36, 37 articulated thereto can be swiveled about them.

The retaining device 40 can be coupled to the actuator 37. The retaining device 40 includes a spring mount 44, which is of housing-like design and which holds one or more spring elements 43. In this case, the spring elements 43 can be stressed by compression. At one end the spring elements 43 rest on the spring mount 44. The spring elements 43 are pushed onto support elements 45, and their respective other ends rest on a connection element 41 to which the support elements 45 are fastened. The connection element 41 has a swivel bearing 41.1. A swivel lever 42 is coupled to this swivel bearing 41.1, which is coupled to the 10th link 39.1, just like the actuating lever 39.

The kinematic arrangement 30 is disposed between two attachment sections 51, 53, wherein the two attachment sections 51, 53 may substantially be designed as mirror images. FIG. 2 shows the two attachment sections 51, 53, which are disposed in parallel to and spaced apart from each other. Each of the attachment sections 51, 53 has an exterior and an interior. The inner sides of the two attachment sections 51, 53 face each other. The outer sides of the attachment sections 51, 53 form the outer sides of the housing 50. The stationary links 35.1, 36.1 and 38.1 are connected to both attachment sections 51, 53.

As can be seen from FIG. 2, the attachment section 53 has an L mark. This indicates to the user that the attachment section 53 can be used for left-side assembly in a cabinet body. Accordingly, the opposite attachment section 51 is provided with an R-marking, which signals the right-side assembly option. As a result, the furniture connecting fitting can be used for left-side or right-side assembly. This is the reason why the two attachment sections 51, 53 can be designed to be substantially identical and mirror images of each other.

The attachment section 51 will be discussed in the explanations below. The same explanations apply in their way to the attachment section 53.

As can be seen from FIGS. 2 and 3, the attachment section 51 can be manufactured as a punched and bent parts from a sheet-metal blank. The attachment section 51 has a support section 52. This support section 52 is formed by the edge of a recess 54 or penetration recessed from the attachment section 51. Locating elements 55 have been punched from the attachment section 51 and bent protruding towards the exterior of the housing. As shown in the drawings, the locating elements 55 can be formed, for instance, as lobe-shaped lugs. The attachment section 51 may also have a profiled orientation section 56, which may in particular be embossed or beveled.

There are penetrations at the longitudinal ends of the attachment section 51 forming guide mounts 57. These guide mounts 57 are designed as slots whose slot width tapers continuously. For instance, as FIG. 2 shows, for the attachment section 51, the slot width of the guide mount 57 tapers from the left side in FIG. 2 toward the right side of the furniture connecting fitting 10.

As FIG. 3 clearly shows, the kinematic arrangement 30 is attached to the attachment section 51. At the same time, the kinematic arrangement 30 is also attached to the second attachment section 53. For this purpose, the 6th link 35.1, the 7th link 36.1 and the 10th link 38.1 are connected to both attachment sections 51, 53, as mentioned above.

The retaining device 40 is also connected to both attachment sections 51, 53 in the area of its swivel bearing 46. In this way, the two attachment sections 51, 53 are also intercoupled, wherein the kinematic arrangement 30 is held in the housing 50 at least sectionally between the two attachment sections 51, 53.

As FIG. 4 shows, an assembly piece 80 can optionally be connected to one of the two attachment sections 51, 53. In this exemplary embodiment, the assembly piece 80 is connected to the first attachment section 51 for right-side assembly. Of course, the assembly piece 80 can also be connected to the opposite second attachment section 53 for left-side assembly when rotated by 180°. The explanations below therefore also apply to both attachment sections 51, 53 in their way.

FIGS. 6 and 7 show the assembly piece 80 in more detail. As shown in these drawings, the assembly piece 80 can be manufactured as a punched and bent parts from a sheet-metal blank.

The assembly piece 80 has a fitting end 81 and a furniture attachment end 81.3. The fitting end 81 may also be referred to as a fitting side 81. The furniture attachment end 81.3 may also be referred to as a furniture attachment side 81.3. The assembly piece 80 has an alignment element 81.1, which is designed in the shape of an inclined body edge. The inclination in FIG. 6 extends from the left to the right, as the drawing clearly indicates. A contact section 81.2 is provided opposite from the alignment element 81.1. The contact section 81.2 is formed by elevations on opposite ends of the assembly piece 80.

Screw mounts 82, 83 penetrate the assembly piece 80.

The assembly piece 80 has a retaining section 84. In accordance with this exemplary embodiment, the retaining section 84 is formed as a protrusion, resulting in a bearing surface 84.1 that rises above the adjacent sections of the furniture attachment end 81.3.

A bearing mount 84.2 is inserted into the bearing surface 84.1. This is designed in the form of a hole. A stop 84.3 is disposed above the bearing mount 84.2. This can be expressed in the form of an embossing, preferably as a dimple-shaped elevation from the sheet-metal blank.

The retaining section 84 is provided with a left marking 84.4 and a right marking 84.5.

FIGS. 6 and 7 further indicate that mating elements 85 are provided on the assembly piece 80. The mating elements 85 may be formed as tabs punched out of the sheet metal blank and pressed out towards the furniture attachment end 81.3.

The mating element elements 85 have a retaining section 85.2. It is connected integrally to the sheet blank at its two longitudinal ends via angled sections 85.1. There is a plug-in mount for the locating element 55 in the area between the angled sections 85.1 and the retaining section 85.2.

The assembly piece 80 is provided with spacers 86. These spacers 86 protrude beyond the furniture attachment end 81.3. As the drawings illustrate, the spacers 86 may be in the shape of nub-like embossments.

FIG. 6 further illustrates that there are two projections 88 on the assembly piece. These projections 88 may also be formed integrally with the assembly piece 80 and accordingly bent out of the sheet material in one forming step. It is also conceivable that, as in this exemplary embodiment, the projections 88 are separate components that are riveted to the assembly piece 80.

Finally, the assembly piece 80 also has penetrations 89 in the shape of holes. The function of these penetrations 89 is discussed in more detail below with reference to FIG. 12.

To mount the furniture connecting fitting 10, the furniture attachment end 81.3 of the assembly piece 80 is first placed on a panel of a cabinet body 110, to which the furniture connecting fitting 10 is to be fastened. Fastening bolts 90, 91, shown in FIG. 4, are then pushed through the bolt mounts 82, 83 and bolted into the panel of the cabinet body 110.

As FIG. 4 indicates, the fastening bolts 90 may be designed to be bolted into pre-drilled blind holes of a system perforation. The two fastening bolts 91 are used for additional securing and may be designed as self-tapping screws that can be screwed into the panel. Of course, self-tapping screws can also be used instead of fastening bolts 90.

After the assembly piece 80 has been connected to the cabinet body, the actuating element 60 is rotated to a prepared home position according to the desired stop type.

Thus, if, as in this instance, the furniture connecting fitting 10 is installed at its attachment end 51, i.e. a right-side stop is to be implemented, the actuating element 60 is rotated in the bearing mount 84.2 in such a way that the eccentrically disposed part of the operating element 61 covers the left-side marking 84.4 and the R-marking 84.3 is visible. This is to signal to the user that the correct stop type has been set.

Now, the remaining part of the furniture connecting fitting 10 can be attached to the fitting end 81 of the assembly piece 80 with the appropriate attachment section 51, 53 for the respective fitting type (right-side fitting or left-side fitting). Accordingly, as shown in FIG. 2, the remaining fitting section is placed on the assembly piece 80, wherein the projections 88 engage with the guide mounts 57. There, the projections 88 are in the area of the widened ends of the guide mounts 57. Accordingly, the locating elements 55 are disposed in front of the mating elements 85.

The attachment section 51 rests on the ends of the spacers 86. Now the actuating element 60 can be rotated. For this purpose, a screwdriver is inserted through the recess 54 in the opposite attachment piece 53 such that the screwdriver engages with the tool mount 62 of the operating element 61. The screwdriver can then be turned clockwise to the position shown in FIG. 2. In this case, the cylindrical outer circumference of the operating element 61 rolls on the rim delimiting the recess 54 forming the support section 52. As a result of this motion, the attachment section 51 is pushed from the right to the left with respect to the assembly piece 80 of FIG. 2. As a result of this sliding motion, the locating elements 55 are pushed behind the retaining sections 85.2 of the mating elements 85, forming a form-fitting and detachable connection transverse to the furniture attachment end 81.3.

During this motion, the projections 87 in the guide mounts 57 are simultaneously displaced. Because the guide mounts 57 are formed as tapered slots, the attachment section 51 on the assembly piece 80 is oriented in the vertical direction.

Additionally or alternatively, provision may also be made that during motion the alignment element 81.1 runs against the orientation section 56, thereby also permitting a precise orientation. The stop 84.3 limits the sliding motion. When the actuating element 60 has been turned until the operating element 61 abuts the stop 84.3, the mounting position has been reached. The mounting position is illustrated in FIG. 4.

The assignment of the operating element 61 to the stop 84.3 should preferably be made in such a way that self-locking results. In this exemplary embodiment, for instance, the operating element 61 is rotated to such an extent that the contact point between the operating device 61 and the supporting section 52 extends on the line extending horizontally and intersecting the axis of rotation of the bearing pin 63 or is disposed in the area between this line and the stop 84.3. Then, when a force is applied to the furniture connecting fitting 10 in a direction opposite to the assembly direction described above, the connection between the assembly piece 80 and the assigned attachment section 51 cannot be automatically released.

For disassembly, simply insert a screwdriver again through the recess 54 in the attachment section 53 and insert it into the tool mount 62 of the operating element 61. Then, the actuating element 60 can be rotated counterclockwise. This disengages the locating elements 55 and the mating elements 85 and the attachment section 51 is no longer in fastening engagement.

FIGS. 8 and 9 show the actuating element 60 in more detail. As this embodiment further illustrates, the actuating element 60 has a cylindrical operating element 61 that includes a tool mount 62. The bearing pin 63 is eccentrically attached to the operating element 61. An indicator 64 is further provided on the operating element 60. The user can use it to determine whether the actuating element 60 is in the open or closed position. For captive mounting of the actuating element 60, the bearing pin 63 can, for instance, be inserted into the bearing mount 84.2. The bearing pin 63 can then be swaged at the end.

FIGS. 10 and 11 show a view of the previously described hatch holder according to the invention rotated by 180°, wherein the attachment section 51 of the housing 50 has been removed and the assignment of the kinematic arrangement 30 to the attachment section 53 is shown. In the illustration according to FIGS. 10 and 11, different swivel positions are shown on the path between the open and closed positions.

FIGS. 10 and 11 show that the actuating element 38, which acts between the connection element 36 and the actuator 37, comprises a spring element 38.2. This spring element 38.2 is clamped between two components of the actuating element 38 such that it applies a compressive force that struts the actuating element 38 between the 9th link 38.1 and the selected mounting position 36.3, 36.4, i.e. braces them against each other.

In FIG. 10, the actuating element 38 is articulated to the mounting position 36.3. As can be seen in FIG. 10, the mounting position 36.3 is disposed at least on a partial path of motion between the closed position and the open position below a horizontally extending line passing through the swivel point of the stationary 7th link 36.1.

In the closed position of the furniture connecting fitting 10, the spring element 38.2 applies a compressive force to the connection element 36. Because the mounting position 36.3 is disposed below the connecting line, this results in a torque rotating counterclockwise in FIG. 10 with a lever arm corresponding to the distance between the mounting position 36.3 and the connecting line. This torque causes the furniture connecting fitting 10 to open from the closed position. In this mode of operation, an interlocking mechanism may be provided, an instance of which is shown in FIGS. 15 to 22, and which will be explained in detail later. This interlocking mechanism holds the hatch or door in the closed position.

When a user unlocks the interlocking mechanism, the furniture connecting fitting opens automatically because of the tensioning force of the spring element 38.2 at least on a part of the opening path, caused by the spring element 38.2. In this exemplary embodiment, the spring element 38.2 causes an opening up to the partial opening position shown in FIG. 11.

The interlocking mechanism indicated above will be explained in more detail below, with reference to FIGS. 15 to 22.

As FIG. 15 shows, the interlocking mechanism includes an interlock 200. This interlock 200 has an interlock housing 210. The interlock housing 210 includes a top panel 211. Side panels 212 rise laterally from the top panel 211. In its upper section, the interlock housing 210 includes a recess 214. A latch 240, and also, in part a catch 230 that is connected to the latch 240, protrude through this recess 214.

As can be seen from FIG. 16, a lid 217 is attached to the back of the interlock housing 210. Protruding projections 218 are formed or attached to the lid 217. Further, the lid 217 has a screw mount 219 that is aligned with a screw mount 213 of the interlock housing 210.

FIG. 17 shows the open interlock housing 210, wherein the lid 217 has been removed. As this embodiment illustrates, the interlock housing 210 has a support 215. This support can support the lid 217.

The interlock housing 210 further comprises an interlock section 220. This interlock section 220 is equipped with a guide 221. The guide 221, in conjunction with the catch 230, forms an overtravel mechanism.

The guide 221 has an opening 221.1. A transition section 221.2 adjoins this opening 221.1. The transition section 221.2 merges into a deflection section 221.3. On one end, the deflection section 221.3 is formed by a deflection body 222, which, like the remaining areas laterally delimiting the guide 221, is preferably integral with the interlock housing 210. Next to the deflection section 221.3, the guide 221 forms a 1st stop 221.4. A 2nd stop 221.6 is further provided at a distance from the 1st stop 221.4. A park position 221.5 of the guide 221 is provided between the 1st and 2nd stops 221.4 and 221.6. This park position 221.5 is preferably formed by a parking section 222.2.

A return 221.7 adjoins the 2nd stop 221.6. This return 221.7 merges into a deflection section 221.8, which in turn merges into the transition section 221.2.

As described above, the catch 230 interacts with the guide 221.

The catch 230 is shown in more detail in the drawings 18 and 19. As this embodiment illustrates, the catch 230 includes a lever 232. The lever 232 bears a swivel bearing 231 and a catch piece 233 at the opposite end. FIG. 19 shows that a bearing surface 235 is formed in the area around the swivel bearing 231. Furthermore, integrally formed ribs 234 are provided to stiffen the lever 232.

The shape of the latch 240 can be seen in more detail in FIGS. 20 and 21. As these drawings illustrate, the latch 240 includes a base body 241. This base body 241 is equipped with a bearing mount 242. Further, the base body 241 includes a catch bearing 248 spaced from the bearing mount 242.

An extension 245 is connected to the base body 241. This lug 245 delimits a driver mount 246. The driver mount 246 is further also delimited by or connected to a deflection section 247.

As shown in FIG. 20, the latch 240 has a spring mount 244, which may be disposed in the area of the bearing mount 242, for instance, as shown in FIG. 20. A clearance 243 is also provided in the area of this spring mount 244.

FIG. 21 shows a rear view of the latch 240. As this embodiment indicates, both the bearing mount 242 and the catch bearing are formed as through holes. A mating surface 249 is provided around the catch bearing 248.

A bearing piece 216 is provided in the interlock housing 210 for mounting the latch 240 in the interlock housing 210. This bearing piece 216 may have the form of a bearing pin integrally formed with the interlock housing 210. Prior to mounting the latch 240, a spring 250 is connected to the latch, shown in part by dashed lines and in part in extended view in FIG. 17. The spring 250 may be a torsion spring, for instance, and has two spring arms 251, 253. The spring arms 251, 253 are interconnected by a tensioning section 252.

The spring arm 253 of the spring 250 is inserted into the spring mount 244. The tensioning section 252, as illustrated in FIG. 17, is formed as an annular curved section and fits into the clearance formed at the bearing mount 242. The area surrounded by the annularly curved section of the spring 250 is then aligned with the bearing mount 242. As shown in FIG. 17, the 2nd spring arm 251 is supported in the transition area between the top panel 211 and a side panel 212.

The spring 250 is inserted into latch 240, wherein the spring arm 251 extends from the clearance 243. Then, the latch 240 is slid onto the bearing piece 216. The spring 250 then comes to rest in its position shown in FIG. 17, assuming a preload condition. Because of this spring preload, the latch 240 is held preloaded in the angled position shown in FIG. 17. The catch 230 can then be connected to the latch 240. For this purpose, the swivel bearing 231 of the catch 230 is inserted into the catch bearing 248. The insertion motion is limited by the bearing surface 235 of the catch 230, which comes into contact with the mating surface 249 of the latch 240.

When all the assembly units have been inserted into the interlock housing 210, the lid 217 can be put on and snapped to the interlock housing 210, for instance.

In the position shown in FIG. 17, the latch 240 is in its home position. If the latch 240 is now swiveled counter-clockwise as shown in FIG. 17, it moves against the preload of the spring 250. Owing to this swiveling motion, the catch piece 233 of the catch 230 moves into the guide 221. The catch piece 233 enters the transition section 221.2 through the opening 221.1 of the guide 221. Subsequently, the catch piece 233 meets the deflection slope 222.1 of the deflection body 222 and slides along the deflection section 221.3 until it reaches the area of the 1st stop 221.4. If the latch 240 is now unloaded, the catch piece 233 moves against the deflector body 222 and reaches the park position 221.5. This is the position in which the furniture hatch is in a closed position. If an operator now applies an over-travel to the furniture hatch, the catch piece 233 enters the area of the 2nd stop 221.6. If then the furniture hatch is now unloaded, the spring element 38.2 of the 1st actuating lever 38 presses the kinematic arrangement 30 to a partially open position, as explained above. The catch piece 233 then moves out of the position of the 2nd stop 221.6 and travels back into the transition section 221.2 via the return 221.7 until it stops again in the area of the opening 221.1 and reaches the position shown in FIG. 17. This position is secured with a stop. For instance, as FIG. 17 shows, the latch 240 may abut against the right-side panel 212 of the interlock housing 210. In this position, the furniture hatch is also released and can be moved automatically in the direction of the open position by the 1st control lever 38.

The bracket 300 shown in FIG. 22 can be used to connect the furniture hatch to the interlock 200. The bracket 300 has an attachment arrangement 310 including a mounting plate 311. The mounting plate 311 may be provided with one or more attachment mounts 312. The attachment arrangement 310 has a bearing section 313 penetrated by a bearing mount. Furthermore, a lock piece 314 is provided on the attachment arrangement 310. The lock piece 314 has a spring element 316. Furthermore, the lock piece 314 also forms a snap mount 315.

A retaining element 321 is mounted to the attachment arrangement 310. For this purpose, the retaining element 321 has a bearing attachment 322. This bearing attachment 322 is connected to the bearing section 313 of the attachment arrangement 310 in a swiveling manner. The retaining element 321 has a snap element 323 at its end facing away from the bearing attachment 322. Furthermore, an interlock section 324 is provided on the retaining element 321.

In an interlocking position shown in FIG. 22, the snap element 323 engages with the snap mount 316 in the manner of a snap connector.

The bracket 300 can be attached to the inside of the furniture hatch. For this purpose, fastening bolts are inserted through the attachment mounts 312 and bolted into the back of the furniture hatch. In the closed position, the bracket 33 is disposed in the area of a side panel of the cabinet body. Here, the interlock section 324 is oriented toward the side panel. The interlock 200 may be attached to the side panel as shown in FIGS. 15 through 21. For this purpose, the end of the interlock 200 bearing the lid 217 is placed against the inside of the vertical side panel of the cabinet body. When protrusions 218 are used, they are inserted into a system perforation introduced at the inside of the side panel. In that way, the interlock 200 is precisely aligned with respect to the cabinet body. To secure the interlock 200, a fastening bolt is inserted through the interaligned bolt mounts 213 and 219 and bolted into the side panel of the cabinet body.

The mode of operation of the interlock 200 is as follows. When the furniture hatch is moved from the open position towards the closed position, the interlock section 324 of the bracket 300 encounters the deflection section 247. When the closing motion continues, the latch 240 is swiveled to its closed position as described above (counterclockwise as shown in FIG. 17). When the closed position is reached, the catch piece 233 is in the park position 221.5. The furniture hatch is now securely locked in the catch position, with the kinematic arrangement 30 using the spring element 38.2 of the 1st actuating lever 38 to apply a preload in the opening direction to the furniture hatch via the kinematic arrangement 30. After applying an over-travel to the furniture hatch, the furniture hatch can be unlatched as described above.

Now, if a user does not apply an over-travel as intended, but pulls directly on the furniture hatch, the release mechanism of the bracket 300, which is formed by the snap element 323 and the snap mount 315, protects the furniture connecting fitting against damage. In this case, the spring element 315 deflects and releases the snap element 323. The furniture hatch can then be swung open unhampered.

When the furniture hatch is closed again, the interlock section 324 runs onto the deflection section 247 outside of the driver mount 246. It is then deflected here and placed into the driver mount 246, and at the same time the snap element 323 is moved into the snap mount 315 until it snaps-in there. Then the proper closed position is restored.

As indicated above, the connection element 36 may be used to connect the actuating arrangement 70. The actuating arrangement 70 is shown in FIG. 12. As this drawing illustrates, the actuating arrangement 70 has an actuator 72. It can be cap-shaped, for instance, as illustrated in FIG. 12. The actuator 72 has a mounting part 72.1, into which a mount 72.2 is inserted. The mount 72.2 is open to one side and a stop 72.4 is provided on the other side of the mount 72.2. As FIG. 12 further shows, a lock piece 72.3 can be provided at the actuator 72.

A damper 71 can be inserted into the mount 72.2 of the actuator 72. The damper 71 can be designed as a fluid damper, for instance as an air or oil damper. It features a cylinder 71.1. A piston is guided adjustably inside. A piston rod 71.2 is connected to the piston. The damper 71 is inserted into the mount 72.2 such that its end facing away from the piston rod 71.2 rests against the stop 72.4. Accordingly, the stop 72.4 limits the insertion motion of the damper 71 into the mount 72.2.

The actuating arrangement 70 also has a holder 73. The holder 73 is cap-shaped and has an open end on one side and a base 73.3 on the opposite end. The holder 73 encloses a mount having a support part 73.1, which may be similar in design to the mount 72.2 of the actuator 72. The support part 73.1 is equipped with a handle 73.2.

As FIG. 12 further shows, an attachment piece 73.4 can be provided on the holder 73, which attachment piece can have two legs spaced apart from each other. The attachment piece 73.4 forms a snap mount 73.5.

At least one retaining element 73.6 is provided on the holder 73. In this exemplary embodiment, retaining elements 73.6 are provided on opposite ends of the support part 73.1. Furthermore, a marking 73.7 can be provided, which in this exemplary embodiment is disposed in the area of the retaining elements 73.6.

The holder 73 is connected to the actuator 72 to assemble the actuating arrangement 70. For this purpose, the mounting part 72.1 is inserted into the mount surrounded by the support part 73.1, in the assembly direction from the left to the right in FIG. 12. A sliding guide is then formed between the outer contour of the mounting part 72.1 and the inner contour of the pressure part 73.1. This permits the actuator 72 to be linearly adjusted relative to the holder 73.

In the assembled state, the end of the piston rod 71.2 rests on the base 73.3. Accordingly, when the actuator 72 is pushed linearly into the support part 73, it acts against the damping force of the damper 71, wherein the piston rod 71.2 pushes into the cylinder 71.1. The lock piece 72.3 is used to hold the actuator 72 captive on the holder 73 in the maximum extension positions. Accordingly, in the assembled position, the lock piece 72.3 strikes against a stop in the mount of the holder 73.

As can be seen in FIGS. 10 and 11, the connection element 36 has a guide 36.6. The guide 36.6 is recessed from the connection element 36 as a slot-shaped recess. A mating snap element 36.5 is disposed in the guide 36.6. This mating snap element 36.5 is formed by a cylindrical pin, for instance.

To install the actuating arrangement at the connecting element 36, the actuating arrangement 70 is attached to the connecting element 36 such that the mating snap element 36.5 snaps into the snap mount 73.5.

FIGS. 10 and 11 show the connecting element 36 having blocking pieces 36.7. A plurality of blocking pieces 36.7 are provided, preferably spaced equidistantly from each other.

In this exemplary embodiment, the blocking pieces 36.7 are laterally recessed from the connection element 36 as a slot-shaped recess. As FIGS. 10 and 11 indicate, blocking pieces 36.7 are assigned a scale. In FIG. 10, the retaining elements 73.6 are accordingly inserted into the blocking pieces 36.7 assigned to the marking 3. In this way, the actuating arrangement 70 is secured to the connection element 36 in the direction of the guide 36.6 in a form-fitting manner. The captive fixing of the actuating arrangement 70 to the connecting element 36 is secured by the snap connection between the mating snap element 36.5 and the snap mount 73.5.

To secure the actuating arrangement 70 in another mounting position, it is gripped by the handle 73.2 and pulled away from the connection element 36, disengaging the retaining elements 73.6 from the blocking pieces 36.7 and releasing the snap connection between the mating snap element 36.5 and the snap mount 73.5. Now the actuating arrangement 70 can be reattached in a modified mounting position. For this purpose, the mating snap element 36.5 is moved to the desired position in the guide 36.6, as can be seen from the adjusted arrangement in FIGS. 10 and 11. Then, the actuating arrangement 70 can be reattached to the connecting member 36 in the modified mounting position. In FIG. 11, the actuating arrangement 70 is now secured in a maximum adjustment position.

The stop 72.4 of the actuating arrangement 70 forms a contact point for a counter stop 37.2. As shown in FIGS. 10 and 11, the counter stop 37.2 can be designed as a roller that rolls on the stop 72.4. The counter stop 37.2 is attached to the actuator 37. As soon as the stop 72.4 meets the counter stop 37.2, the actuator 72 is adjusted against the damping effect of the damper 71. In this way, the closing motion of the furniture connecting fitting 10 can be damped.

By adjusting the actuating arrangement 70 on the connection element 36 in the various fastening points, the user can individually set the time from which the damping is effective. As can be seen in FIG. 10, the damping effect sets in relatively late in the setting selected there, whereas in the representation shown in FIG. 11, the damping force takes effect earlier. This damping prevents the door or hatch from hitting hard in the closed position during the closing motion.

FIG. 12 shows that instead of the damper 71, a tension spring 74 can be installed with the actuating arrangement 70. The tension spring 74 is designed as a compression spring and has support surfaces 74.1 and 74.2 on opposite ends. The support surface 74.1 is supported by the base 73.3 and the support surface 74.2 is supported by the stop 72.4 when the tension spring 74 is inserted in the mount 72.2. The tension spring 74 braces the actuator 72 relative to the holder 73. Accordingly, the actuator 72 can be pushed into the holder 73 against the force of the tension spring 74.

Now, when the actuating arrangement is used in a mode of operation where the tension spring 74 is used, the actuating arrangement 70 assists in the opening motion of the furniture connecting fitting 10. Accordingly, the actuator 72 presses against the counter stop 37.2. The opening motion is supported until the actuator 72 is in the maximum extended position.

The furniture connecting fitting 10 may be configured such that the actuating element 38 is connected to the mounting position 36.3, and the actuating arrangement 70 is equipped with the tension spring 74. When the furniture connecting fitting is in its closed position, i.e. the hatch or door is closed, the spring element 38.2 of the actuating element 38 (for instance after unlatching the hatch or door—cf. above) causes an initial opening motion. It is supported by the tension spring 74. After the spring element 38.2 has unloaded, the tension spring 74 continues to be effective and causes further opening motion until the furniture connecting fitting 10 reaches a partially open position or, particularly preferably, is in a fully open position.

In another mode of operation, the furniture connecting fitting 10 may be configured to have the damper 71 installed with the actuating arrangement 70. The actuating element 38 is then preferably connected to the second mounting position 36.4.

The second mounting position 36.4 is above the horizontal line passing through the swivel point of the 7th link 36.1. Accordingly, a counterclockwise torque is applied to the connection element 36, caused by the spring element 38.2. Owing to this torque, the actuating element presses the furniture connecting fitting 10 into the closed position in the last part of the adjustment travel. This closing motion acts against the damping effect of the actuating arrangement 70, which then bears against the counter stop 37.2. In the closed position, the actuating element 38 with the spring element 38.2 holds the connection element 36 taut in the closed position thus securing it.

FIGS. 13 and 14 illustrate another detail of the furniture connecting fitting 10. These figures show enlarged sections of the furniture connecting fitting 10 in the hinge position shown in FIG. 10.

As shown in these drawings, the furniture connecting fitting 10 has the retaining device 40 with at least one spring element 43. In this instance, three spring elements 43 are used. The spring elements 43 are disposed in the spring mount 44 and pushed onto the support elements 45. The spring elements 43 act on the connection element 41.

In the shown representation, the spring elements 43 are disposed a short distance back from the connection element 41 to reveal the support elements 45. In fact, in the operating position, the shown ends of the spring elements 43 rest against the connection element 41.

The spring elements 43 apply a compressive force to the connection element 41. This compressive force attempts to move the fastener 41 from the rear of the furniture connecting fitting 10 towards the front in the drawing plane of FIG. 13.

The connection element 41 is connected to the swivel lever 42 via the bearing 41.1. The swivel lever 42, for its part, is attached to the 10th link 39.1 in a swiveling manner. Accordingly, the swivel lever 42 is attached to the actuator 37 in a swiveling manner.

The actuator 37 is designed as a 2-part lever. As can be seen from the drawings, the actuator 37 has two spaced-apart sub-elements for this purpose, which, as in this exemplary embodiment, may be formed by plate-shaped elements, in particular by steel sheet blanks. The attachment lever 31, the deflection levers 33, 34, the connection element 36, the actuating lever 39 and/or the swivel lever 42 can be designed along the same lines.

In FIG. 14, the component of the 2-part actuator 37 facing the viewer is removed to show the structure of the swivel lever 42 more clearly. As this drawing shows, the swivel lever 42, like the actuator 37, is designed as a 2-armed lever, wherein these two levers swivel in conjunction about the 10th link 39.1. The connection element 41 is attached to one arm of the swivel lever 42. The other arm of the swivel lever 42 is coupled to an adjustment device 37.3.

As FIG. 14 shows, the adjustment device 37.3 has an adjustment element 37.4. The adjustment element 37.4 may be formed like a screw. The screw has a screw head with a tool mount 37.6. For instance, a Torx bolt or a hexagon socket bolt of a typical design can be used.

The setting element 37.4 is rotatably mounted about the central longitudinal axis at a bearing piece 37.5 in the area of the tool mount 37.6. The bearing piece 37.5 is swivel mounted on the actuator 37 by means of a swivel bearing 37.9. In FIG. 14, the swivel axis is perpendicular to the image plane. The threaded section of the adjustment element 37.4 is bolted into a threaded mount of an adjusting piece 37.8. The adjustment piece 37.8 is swivel mounted on the swivel lever 42. The swivel axis of the adjusting piece 37.8 is perpendicular to the image plane of FIG. 14. Furthermore, the adjusting piece 37.8 has guide projections. These protrude on opposite ends of the swivel lever 42. The guide projections are each inserted in a guide 37.7 of the actuator 37 and can be displaced therein along the guide contour.

To adjust the adjustment device 37.3, a tool, for instance a screwdriver, can be inserted into the tool mount 37.6 from the front end when the hatch is open, wherein the direction of insertion then extends from the front end to the rear end of the furniture connecting fitting 10. The open position is shown in FIG. 3. Compared to the positioning according to FIGS. 13 and 14, the tool mount 37.6 is then disposed to be conveniently accessible from the front. The adjustment element 37.4 can then be rotated with the tool. Because the adjustment element 37.4 is in threaded engagement with the adjusting piece 37.8, the adjusting piece 37.8 and the swivel lever 42 are moved in conjunction with each other. As a result of this adjustment, the guide projections of the adjusting piece 37.8 also move in the guides 37.7, for instance from the left to the right in the drawing of FIG. 14. During such an adjustment, the swivel lever 42 is rotated about the axis of rotation of the 10th link 39.1. In doing so, the bearing 41.1 is also adjusted. In this instance, when the adjusting piece 37.8 is adjusted to the right in the image plane, the bearing 41.1 swivels top left. The bearing 41.1 forms the force transfer point, in which the force of the retaining device 40 is introduced into the roller chain via the swivel lever 42 and the actuator 37 by means of the 2nd actuating lever 39. If the swivel lever 42 is now adjusted, the spring elements 43 are relieved of some of their load and the preload of the spring elements 43 is reduced in this way. This results in a reduced clamping force. In this way, the hatch holder can be adjusted to lower hatch weights.

In FIG. 13, a plus sign indicates the adjustment position, in which the spring preload is at a maximum. A minus sign is used to mark the adjustment position, in which the spring tension is at a minimum.

When the adjusting device 37.3 is moved, the swivel lever 42 swivels, as mentioned above. As a result of this swiveling of the swivel lever 42, the adjustment element 37.4 is also swiveled about the swivel bearing 37.9. Furthermore, the adjustment element 37.4 also swivels relative to the swivel-mounted adjusting piece 37.8.

As mentioned above, the holding force generated by the retaining device 40 is introduced into the roller chain of the furniture connecting fitting 10.

As shown in FIG. 3, this roller chain is supported by the stationary 6th link 35.1, the stationary 7th link 36.1 and the 1st link 32.1, the 2nd link 32.2, the 3rd link 33.1, the 4th link 34.1 and the 5th link 34.2 and the attachment lever 31, the two deflection levers 33, 34, the articulated lever 35, and the connection element 36.

By means of this roller chain, the attachment lever 31 (and with it a hatch coupled thereto) can be swiveled between an open and a closed position.

As FIG. 13 clearly illustrates, the actuator 37 is used, on the one hand, with the 2nd lever arm of the actuator 37 to hold the first actuating lever 38 and at the other lever arm to hold the adjustment device 37.3.

Ultimately, the holding force generated by the retaining device 40 is transferred to the roller chain via the 2nd actuating lever 39.

The actuating lever 39 can be swiveled in conjunction with the actuator 37 and the swivel lever 42 about a common axis of rotation, wherein this axis of rotation is formed by the 10th link 39.1.

As FIG. 14 further shows, in a second mode of use, the counter stop 37.2 can also be used to limit the opening motion of the hatch holder in the open position. For this purpose, the counter stop laterally strikes a lever, for instance the swivel lever 42, if the latter is in the open position.

FIGS. 13 and 14 also indicate that the hatch holder has a compact design. In particular, to this end, the retaining device 40 is disposed behind the roller chain in the direction shown in the drawings, which extends from the left to the right, i.e. from the stop end to the opposite rear end.

FIGS. 13 and 14 also indicate that when the roller chain is adjusted to move the hatch from the closed position towards the open position, the connection element 41 is moved mainly from the rear towards the front (when the hatch is closed, the connection element 41 is moved in the opposite direction). The roller chain takes up this motion of the connection element 41 and passes it from the back to the front. In this respect, the furniture connecting fitting 10 according to the invention does not require a reversal, which supports a stable and compact design.

FIGS. 23 and 24 show an assembly element 100. The assembly element 100 has an abutment 102, angled away from which there is a stop 101. A retaining element 103 is retained on the abutment 102. The assembly element 100 is preferably formed integrally as a plastic injection molded part.

The assembly element 100 in conjunction with the assembly piece 80 is used as an assembly aid. As FIG. 25 indicates, the furniture connecting fitting 10 may be attached to a cabinet body 110. The cabinet body 110 is built in the standard way. It has two side panels 111 parallel to each other and a top panel 112 connecting the two side panels 111. The side panels 111 have a front surface 113 in the area of the furniture opening. The top panel 112 has an underside 114.

To use the assembly piece 80 as a drilling template, first connect the assembly element 100 to the assembly piece 80. According to the desired type of stop, the retaining element 103 of the assembly piece 100 is hooked onto the mating element 85, as shown in FIG. 25. For this purpose, the retaining element 103 is inserted behind the retaining section 85.2 of the mating element 85 i.e., it is self-retaining. Now, the retaining element 100 can be placed at the cabinet body 110 such that the stop 101 rests on the front surface 113 of the assigned side panel 111. The furniture attachment end 81.3 of the assembly piece 80 rests against the inside of the side panel 111. For a precise orientation of the assembly piece 80 in the height direction, the two out contact sections 81.2 rest against the underside 114 of the cover panel 112. In this way, the assembly piece 80 is precisely aligned in a desired drilling template position. Now the two penetrations 89 can be used to insert the drilled holes at the desired location. For this purpose, a drill bit is placed through the penetrations 89 and the drilled hole is made in the side panel 111. Subsequently, the assembly piece 80 with its two projections 88 can be inserted into the previously created drilled holes. In doing so, the assembly piece 80 is moved downward a distance from the underside 114 of the top panel 112. The now precisely aligned assembly piece 80 can be fastened to the side panel 111 with additional fastening bolts 90 or 91, as described above. Finally, as described above, the attachment section 51, 53 is used to secure the remaining fitting part to the assembly piece 80.

The invention claimed is:

1. A furniture connecting fitting, comprising:

an attachment section including a locating element;

a mechanical linkage connected indirectly or directly to the attachment section;

an assembly piece configured to couple the attachment section to a cabinet body, the assembly piece including a fitting side facing the attachment section and a furniture attachment side facing away from the fitting side, the assembly piece including a mating element configured to interact with the locating element to form a form-fitting engagement and a detachable connection of the assembly piece to the attachment section; and an actuating element movable between a release position and a blocking position, wherein in the blocking position the actuating element rests against a support section of the attachment section to secure the attachment section in an assembled position relative to the assembly piece with the mating element in the form-fitting engagement with the locating element, and when in the release position the form-fitting engagement between the mating element and the locating element is released so that the attachment section can be detached from the assembly piece;

wherein the locating element and the mating element are configured to be brought into the form-fitting engagement along an adjustment path; and wherein the actuating element includes an operating element defined on a control cam, the operating element being configured to effect a travel of the attachment section relative to the assembly piece along the adjustment path as the actuating element moves from the release position to the blocking position.

2. The furniture connecting fitting of claim 1, wherein:

the attachment section is a part of a housing or is coupled to the housing; and the mechanical linkage includes a hinge assembly pivotally connected to the housing and at least partially received in the housing.

3. The furniture connecting fitting of claim 1, wherein:

the attachment section or a component connected to the attachment section includes an orientation section;

the assembly piece includes an alignment element; and the alignment element and the orientation section are configured such that in the assembled position the alignment element abuts the orientation section.

4. The furniture connecting fitting of claim 1, wherein:

the assembly piece includes screw mounts configured to secure the assembly piece to the cabinet body.

5. The furniture connecting fitting of claim 1, wherein:

one of the assembly piece and the attachment section includes a retaining section, the actuating element being adjustably mounted on the retaining section.

6. The furniture connecting fitting of claim 5, wherein:

the actuating element is rotatably mounted on the retaining section.

7. The furniture connecting fitting of claim 6, wherein:

the assembly piece includes a bearing mount;

the actuating element includes a bearing pin rotatably mounted in the bearing mount, the bearing pin having an axis of rotation;

the operating element is eccentrically disposed with respect to the axis of rotation of the bearing pin, the operating element being configured to interact with the support section of the attachment section.

8. The furniture connecting fitting of claim 1, wherein:

the actuating element includes a tool mount accessible to a tool from an end of the actuating element facing away from the furniture attachment side of the assembly piece; and the mechanical linkage is configured such that in a first operating position of the mechanical linkage access to the tool mount is blocked, and in a second operating position of the mechanical linkage access to the tool mount is permitted.

9. The furniture connecting fitting of claim 1, wherein:

the assembly piece includes a stop against which the actuating element rests in the blocking position.

10. The furniture connecting fitting of claim 1, wherein: the attachment section is one of two attachment sections defining opposite sides of a housing such that the furniture connecting fitting can be used for right-side or left-side assembly on the cabinet body;

the assembly piece is configured to be optionally attached to either one of the two attachment sections; and the actuating element is adjustably mounted on the assembly piece.

11. The furniture connecting fitting of claim 1, wherein: the assembly piece is formed as a stamped and bent part from a sheet metal blank and the mating element is integrally formed on the assembly piece; and the mating element includes a retaining section and an angled section holding the retaining section at a distance from a surface of the fitting side of the assembly piece.

12. The furniture connecting fitting of claim 1, wherein: the assembly piece includes one or more spacers projecting beyond a surface forming the furniture attachment side of the assembly piece, the spacers bearing against the attachment section in the assembled position.

13. The furniture connecting fitting of claim 1, wherein: one of the assembly piece and the attachment section incudes a guide element and the other of the assembly piece and the attachment section includes a guide mount, the guide element engaging the guide mount such that the guide element is guided in or on the guide mount during travel of the attachment section from an initial position to the assembled position.

14. The furniture connecting fitting of claim 1, wherein: the assembly piece includes one or more projections configured to engage in a bore mount of the cabinet body in a form-fitting manner.

15. A method of installing the furniture connecting fitting of claim 1 in the cabinet body, the cabinet body including a side panel and a top panel, the method comprising steps of:

placing a contact section of the assembly piece against an underside of the top panel;

drilling a plurality of holes into the cabinet body using the assembly piece as a drilling template, the assembly piece including a plurality of penetrations through which the holes are drilled; and connecting the assembly piece to the cabinet body using a plurality of fastening bolts.

16. The method of claim 15, wherein the assembly piece includes a plurality of projections, the method further comprising:

inserting the projections into at least some of the holes of the cabinet body.

* * * * *